United States Patent
Haba et al.

(10) Patent No.: US 10,027,842 B2
(45) Date of Patent: Jul. 17, 2018

(54) SETTING SYSTEM, IMAGE PROCESSING DEVICE, REMOTE CONTROL METHOD, AND REMOTE CONTROL PROGRAM

(71) Applicant: Konica Minolta, Inc., Chiyoda-ku, Tokyo (JP)

(72) Inventors: Shoko Haba, Toyokawa (JP); Kenichi Komaba, Toyokawa (JP); Shinichi Asai, Gamagori (JP); Hiroki Ueda, Hachioji (JP); Yu Sonoda, Toyokawa (JP)

(73) Assignee: KONICA MINOLTA, INC., Chiyoda-ku, Tokyo (JP)

( * ) Notice: Subject to any disclaimer, the term of this patent is extended or adjusted under 35 U.S.C. 154(b) by 0 days.

(21) Appl. No.: 15/459,446

(22) Filed: Mar. 15, 2017

(65) Prior Publication Data

US 2017/0280003 A1 Sep. 28, 2017

(30) Foreign Application Priority Data

Mar. 23, 2016 (JP) .................................. 2016-059056

(51) Int. Cl.
*H04N 1/32* (2006.01)
*H04N 1/00* (2006.01)
*H04N 1/327* (2006.01)
*H04M 1/725* (2006.01)

(52) U.S. Cl.
CPC .... *H04N 1/32117* (2013.01); *H04M 1/72527* (2013.01); *H04N 1/00307* (2013.01); *H04N 1/00875* (2013.01); *H04N 1/32507* (2013.01); *H04N 1/32523* (2013.01); *H04N 1/32786* (2013.01)

(58) Field of Classification Search
CPC combination set(s) only.
See application file for complete search history.

(56) References Cited

U.S. PATENT DOCUMENTS

2015/0077787 A1* 3/2015 Nishimura ......... G03G 15/5075
358/1.14

FOREIGN PATENT DOCUMENTS

JP 2012-199647 A 10/2012

* cited by examiner

*Primary Examiner* — Helen Zong
(74) *Attorney, Agent, or Firm* — Buchanan Ingersoll & Rooney PC

(57) ABSTRACT

An image processing device includes: a hardware processor configured to: execute a process according to a received remote operation in response to reception of the remote operation from a master device registered in advance among a plurality of mobile information devices; confirm to a duplicate login device other than an own device among the plurality of image processing devices that the duplicate login device is remotely operated by the master device in a case where a remote operation of instructing connection with a sub device different from the master device is received from the master device; and execute a process according to a remote operation received from the sub device in a case where it is confirmed by a confirmation unit that the duplicate login device is remotely operated by the master device.

26 Claims, 16 Drawing Sheets

FIG. 9

MFP100

| USER IDENTIFICATION INFORMATION | AUTHENTICATION INFORMATION |
|---|---|
| USER A | PASSWORD A |
| USER B | PASSWORD B |
| USER C | PASSWORD C |

FIG. 10

MFP100A

| USER IDENTIFICATION INFORMATION | AUTHENTICATION INFORMATION |
|---|---|
| USER A | PASSWORD A |
| USER B | PASSWORD B |
| USER C | PASSWORD C |
| USER D | PASSWORD D |

FIG. 11

MFP100

| TERMINAL IDENTIFICATION INFORMATION | TERMINAL A | TERMINAL C |
|---|---|---|
| REGISTERED USER | USER A, USER B | ARBITRARY |
| NETWORK | AAA DOMAIN | ARBITRARY |
| DISTANCE FROM TERMINAL | ARBITRARY | 10 m OR LESS |
| AVAILABLE MODE | MANAGER | GENERAL USER |

FIG. 12

MFP100A

| TERMINAL IDENTIFICATION INFORMATION | TERMINAL A | TERMINAL B |
|---|---|---|
| REGISTERED USER | USER A | ARBITRARY |
| NETWORK | ARBITRARY | ARBITRARY |
| DISTANCE FROM TERMINAL | 5 m OR LESS | 10 m OR LESS |
| AVAILABLE MODE | MANAGER | GENERAL USER |

SETTING SYSTEM, IMAGE PROCESSING DEVICE, REMOTE CONTROL METHOD, AND REMOTE CONTROL PROGRAM

The entire disclosure of Japanese Patent Application No. 2016-059056 filed on Mar. 23, 2016 including description, claims, drawings, and abstract are incorporated herein by reference in its entirety.

BACKGROUND OF THE INVENTION

Field of the Invention

The present invention relates to a setting system, an image processing device, a remote control method, and a remote control program, and more particularly, to a setting system for setting a plurality of image processing devices, an image processing device thereof, a remote control method and a remote control program executed by using the image processing device.

Description of the Related Art

An image processing device represented by a multifunction peripheral (hereinafter, referred to as an "MFP") executes a process according to setting information set by a user. In addition, the MFP can be remotely operated by using a mobile information device such as a smartphone or a PDA (Personal Digital Assistant). JP 2012-199647 A discloses a technique for remotely operating a plurality of MFPs by using a mobile information device to set the same setting information in a plurality of the MFPs.

However, since a plurality of the MFPs are remotely controlled by a single personal computer (hereinafter, referred to as a "PC"), there is a problem that the screens need to be switched in order to display the setting information of the respective MFPs. On the other hand, by remotely controlling a plurality of the MFPs by using the respective mobile information devices, it is possible to display the setting information of the MFPs which are remotely controlled on the respective mobile information devices. On the other hand, in some cases, the respective MFPs restrict the remotely-controlled mobile information device to devices which are registered in advance. In this case, it is necessary for the user to use a plurality of device control devices respectively registered in a plurality of the MFPs. For example, in a case where a first mobile information device registered in two MFPs and a second mobile information device not registered in any of the two MFPs are used, there is a problem that the two MFPs can be operated remotely by the second mobile information device.

SUMMARY OF THE INVENTION

The present invention has been made in order to solve the above problems, and an object thereof is to provide a setting system enabling a device not registered in an image processing device to remotely operate the image processing device while excluding illegal operations.

Another object of the present invention is to provide an image processing device enabling a device not registered in an image processing device to remotely operate the image processing device while excluding illegal operations.

Another object of the present invention is to provide a remote control method enabling a device not registered in an image processing device to remotely operate the image processing device while excluding illegal operations.

Another object of the present invention is to provide a remote control program enabling a device not registered in an image processing device to remotely operate the image processing device while excluding illegal operations.

To achieve at least one of the abovementioned objects, according to an aspect, an image processing device reflecting one aspect of the present invention comprises: a hardware processor configured to: execute a process according to a received remote operation in response to reception of the remote operation from a master device registered in advance among a plurality of mobile information devices; confirm to a duplicate login device other than an own device among the plurality of image processing devices that the duplicate login device is remotely operated by the master device in a case where a remote operation of instructing connection with a sub device different from the master device is received from the master device; and execute a process according to a remote operation received from the sub device in a case where it is confirmed by a confirmation unit that the duplicate login device is remotely operated by the master device.

According to the aspect, in a case where a remote operation of instructing connection with a sub device is received from a master device, if it is confirmed by a duplicate login device other than an own device that the duplicate login device is remotely operated by the master device, even in a case where the sub device is not registered in advance, a process according to a remote operation received from the sub device is executed. Therefore, it is possible to provide an image processing device enabling an unregistered device to perform remote control while excluding illegal operations.

The hardware processor preferably executes the process according to the remote operation received from the master device on the condition that a user who operates the master device is registered in advance and executes the process according to the remote operation received from the sub device on the condition that a user who operates the sub device is registered in advance.

According to the aspect, since it is a condition for executing the process that the user who instructed the remote operation is registered in advance, it is possible to exclude an operation by an unauthorized user.

The hardware processor preferably executes the process according to the remote operation received from the sub device on the condition that the user who operates the sub device is the same as the user who operates the master device.

According to the aspect, it is possible to restrict the user who can perform remote operation by a device not registered in advance to a user registered in advance in at least two image processing devices.

The hardware processor preferably acquires device identification information for identifying the duplicate login device from the master device and confirms that the duplicate login device is remotely operated by the master device by inquiring of the duplicate login device by using the acquired device identification information.

According to the aspect, since it is confirmed by the duplicate login device, it is possible to exclude an operation by the unauthorized user on the master device.

In response to reception of a confirmation signal, the master device preferably transmits a notification request command including device identification information of a device that has transmitted the confirmation signal to the duplicate login device, in response to reception of the notification request command from the master device, the duplicate login device preferably notifies a device specified by the device identification information included in the notification request command that the duplicate login device is remotely operated by the master device, and after transmitting the confirmation signal to the master device, the hardware processor preferably receives a notification from the duplicate login device that the duplicate login device is remotely operated by the master device, so that it is confirmed that the duplicate login device is remotely operated by the master device.

According to the aspect, since it is confirmed by the duplicate login device, it is possible to exclude an operation by an unauthorized user of the master device.

The hardware processor preferably acquires screen identification information for identifying a first operation screen that the duplicate login device is remotely operated by the master device to select, and the hardware processor preferably executes the process according to the remote operation received from the sub device on the condition that a second operation screen that the hardware processor is remotely operated by the master device to select has a predetermined relationship with the first operation screen.

According to the aspect, in a case where a second operation screen having a predetermined relationship with a first operation screen that the duplicate login device is remotely operated by the master device to select is transmitted to the master device, since the process according to the remote operation received from the sub device is executed, it is possible to restrict the remote operation by using the sub device.

The hardware processor preferably restricts executable processes according to the remote operation received from the sub device.

According to the aspect, it is possible to restrict the remote operation by using the sub device.

One or more executable processes corresponding to a plurality of security levels are preferably defined, and the restriction is preferably restriction to one or more processes defined with respect to the security levels assigned to the user who operates the sub device.

In a case where the process specified by the remote operation received from the sub device is a process of downloading data, the hardware processor preferably transmits data to the master device without transmitting data to the sub device.

According to the aspect, it is possible to simplify the remote operation.

The hardware processor preferably disconnects communication with the sub device in response to end of the remote operation of the duplicate login device by the master device.

According to the aspect, since the communication with the sub device is disconnected in response to end of the remote operation of the duplicate login device by the master device, it is possible to simplify an operation of ending the remote operation by the sub device.

While the master device remotely operates any one of the plurality of image processing devices, the hardware processor preferably executes the process according to the remote operation received from the sub device, and if a predetermined time elapses without the master device remotely operating any one of the image processing devices, the hardware processor preferably disconnects communication with the sub device.

According to the aspect, if a predetermined time elapses without the master device remotely operating any one of the plurality of image processing devices, since communication with the sub device is disconnected, while the plurality of image processing devices are remotely operated by the master device, the remote operation by the sub device can be enabled.

In response to start of the remote operation by the sub device, the hardware processor preferably disconnects communication with the master device, and the hardware processor preferably restarts the remote operation by the master device in response to end of the remote operation by the sub device.

According to the aspect, since communication with the master device is disconnected in response to start of the remote operation by the sub device, it is possible to simplify an operation of disconnecting the communication with the master device. In addition, since the remote operation by the master device is restarted in response to end of the remote operation by the sub device, the remote operation by any one of the master device and the sub device can be enabled.

To achieve at least one of the abovementioned objects, according to an aspect, a setting system reflecting one aspect of the present invention comprises: a plurality of the image processing devices; and a plurality of mobile information devices for remotely operating the plurality of image processing devices.

According to the aspect, in a case where a remote operation of instructing connection with a sub device is received from a master device, if it is confirmed by a duplicate login device other than an own device that the duplicate login device is remotely operated by the master device, even in a case where the sub device is not registered in advance, each of a plurality of image processing devices executes a process according to a remote operation received from the sub device. Therefore, it is possible to provide a setting system enabling a device not registered in an image processing device to remotely operate the image processing device while excluding illegal operations.

To achieve at least one of the abovementioned objects, according to an aspect, a remote control method reflecting one aspect of the present invention causes an image processing device to perform: executing a process according to a received remote operation in response to reception of the remote operation from a master device registered in advance among a plurality of mobile information devices; and confirming to a duplicate login device other than an own device among a plurality of the image processing devices that the duplicate login device is remotely operated by the master device in a case where a remote operation of instructing connection with a sub device different from the master device is received from the master device, wherein the executing of the process according to the received remote operation from the master device includes executing a process according to a remote operation received from the sub device in a case where it is confirmed in the confirming that the duplicate login device is remotely operated by the master device.

According to the aspect, it is possible to provide a remote control method enabling a device not registered in an image processing device to remotely operate the image processing device while excluding illegal operations.

To achieve at least one of the abovementioned objects, according to an aspect, a non-transitory recording medium storing a computer readable remote control program reflecting one aspect of the present invention causes a computer controlling an image processing device to execute the remote control method.

According to the aspect, it is possible to provide a remote control program enabling a device not registered in an image processing device to remotely operate the image processing device while excluding illegal operations.

In the executing of the process according to the received remote operation from the master device, the process according to the remote operation received from the master device is preferably executed on the condition that a user who operates the master device is registered in advance and the process according to the remote operation received from the sub device is preferably executed on the condition that a user who operates the sub device is registered in advance.

In the executing of the process according to the received remote operation from the master device, on the condition that the user who operates the sub device is the same as the user who operates the master device, the process according to the remote operation received from the sub device is preferably executed.

In the executing of the process according to the received remote operation from the master device, device identification information for identifying the duplicate login device from the master device is preferably acquired, and it is preferably confirmed that duplicate login device is remotely operated by the master device by inquiring of the duplicate login device by using the acquired device identification information.

In response to reception of a confirmation signal, the master device preferably transmits a notification request command including device identification information of a device that has transmitted the confirmation signal to the duplicate login device, in response to reception of the notification request command from the master device, the duplicate login device preferably notifies a device specified by the device identification information included in the notification request command that the duplicate login device is remotely operated by the master device, and after transmitting the confirmation signal to the master device, in the executing of the process according to the received remote operation from the master device, a notification that the duplicate login device is remotely operated by the master device is preferably received from the duplicate login device, so that it is confirmed that the duplicate login device is remotely operated by the master device.

In the executing of the process according to the received remote operation from the master device, screen identification information for identifying a first operation screen that the duplicate login device is remotely operated by the master device to select is preferably acquired, in the executing of the process according to the received remote operation from the master device, the process according to the remote operation received from the sub device is preferably executed on the condition that a second operation screen which is remotely operated by the master device to select has a predetermined relationship with the first operation screen.

In the executing of the process according to the received remote operation from the master device, executable processes according to the remote operation received from the sub device are preferably restricted.

One or more executable processes corresponding to a plurality of security levels are preferably defined, and the restriction is preferably restriction to one or more processes defined with respect to the security levels assigned to the user who operates the sub device.

In the executing of the process according to the received remote operation from the master device, in a case where the process specified by the remote operation received from the sub device is a process of downloading data, data is preferably transmitted to the master device without transmitting data to the sub device.

In the executing of the process according to the received remote operation from the master device, communication with the sub device is preferably disconnected in response to end of remote operation of the duplicate login device by the master device.

In the executing of the process according to the received remote operation from the master device, while the master device remotely operates any one of the plurality of image processing devices, the process according to the remote operation received from the sub device is preferably executed, and if a predetermined time elapses without the master device remotely operating any one of the image processing devices, communication with the sub device is preferably disconnected.

In the executing of the process according to the received remote operation from the master device, communication with the master device is preferably disconnected in response to start of the remote operation by the sub device, and the remote operation by the master device is preferably restarted in response to end of the remote operation by the sub device.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 9 is a first diagram illustrating an example of a user table;

FIG. 10 is a second diagram illustrating an example of a user table;

FIG. 11 is a first diagram illustrating an example of a device table;

FIG. 12 is a second diagram illustrating an example of a device table;

DESCRIPTION OF THE PREFERRED EMBODIMENTS

Figure 1:
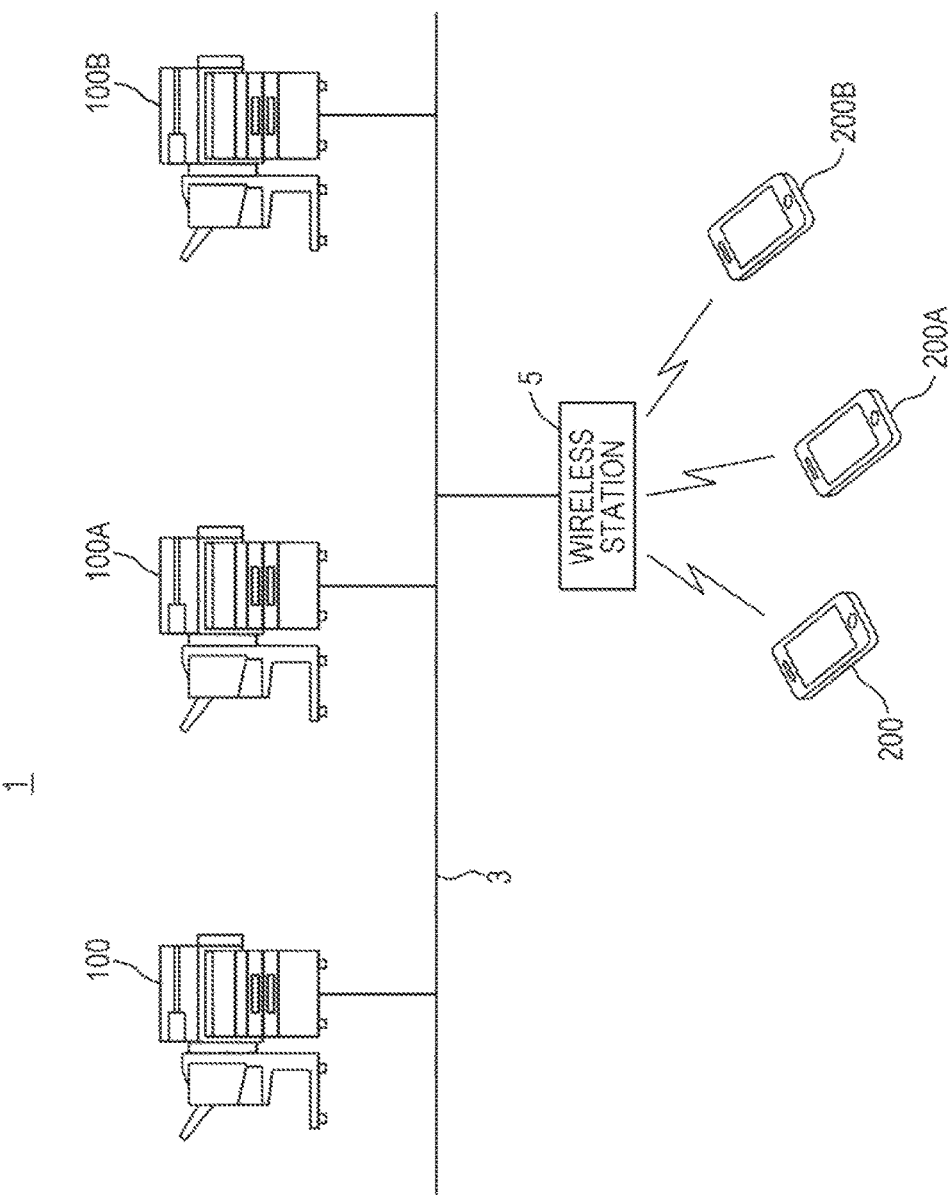
FIG. 1 is a diagram illustrating an overview of a setting system in one embodiment of the present invention.

Hereinafter, an embodiment of the present invention will be described with reference to the drawings. However, the scope of the invention is not limited to the illustrated examples. In the following description, the same components are denoted by the same reference numerals. Names and functions thereof are also the same. Therefore, detailed description thereof will not be repeated.

FIG. 1 is a diagram illustrating an overview of a setting system according to an embodiment of the present invention. Referring to FIG. 1, the setting system 1 is configured to include multi-function peripherals (MFPs) 100, 100A, and 100B, a wireless station 5, and mobile information devices 200, 200A, and 200B. The MFPs 100, 100A, and 100B and the wireless station 5 are connected to a network 3. The mobile information devices 200, 200A, and 200B are connected to the network 3 through the wireless station 5.

The network 3 is a local area network (LAN), and the connection form thereof may be wired or wireless. In addition, the network 3 is not limited to a LAN, but a wide area network (WAN), a public switched telephone network (PSTN), the Internet, or the like may be used.

The mobile information devices 200, 200A, and 200B are computers used by a user such as a smartphone, a PDA, and the like. Since the hardware configurations and functions of the mobile information devices 200, 200A, and 200B are the same, herein, the mobile information device 200 will be described as an example unless otherwise mentioned. In the embodiment, the mobile information devices 200, 200A, and 200B are assumed to be smart phones, and thus, each of the mobile information devices 200, 200A, and 200B has a wireless LAN function and a call function. Therefore, the mobile information device 200 can communicate with a mobile phone base station in a wireless manner to be connecting to a cellular phone network, so that a call can be performed.

In the setting system 1 according to the embodiment, each of the mobile information devices 200, 200A, and 200B can remotely operate any one of the MFPs 100, 100A, and 100B. In this case, each of the mobile information devices 200, 200A, and 200B functions as a remote operation device which remotely operate the MFPs 100, 100A, and 100B, and each of the MFPs 100, 100A, and 100B functions as a remote control device which is remotely operated by one of the mobile information devices 200, 200A, and 200B. In each of the mobile information devices 200, 200A, and 200B, a remote operation program for remotely operating the MFPs 100, 100A, and 100B is installed. The remote operation program is common to the MFPs 100, 100A, and 100B, and is an application program which can be adapted to any of MFPs 100, 100A, and 100B. On the other hand, a remote control program which is remotely operated by any one of the mobile information devices 200, 200A, and 200B and executes processes is installed in the MFP 100. Each of the mobile information devices 200, 200A, and 200B is a remote operation device which remotely operates one or more of the MFPs 100, 100A, and 100B.

In the setting system 1 according to the embodiment, the configurations and executable functions of the MFPs 100, 100A, and 100B are different, but the basic configuration is the same. Herein, the basic configuration of the MFP 100 will be described by using the MFP 100 as an example. In addition, the hardware configurations and functions of the mobile information devices 200, 200A, and 200B are the same. Herein, the mobile information device 200 will be described as an example.

Figure 2:
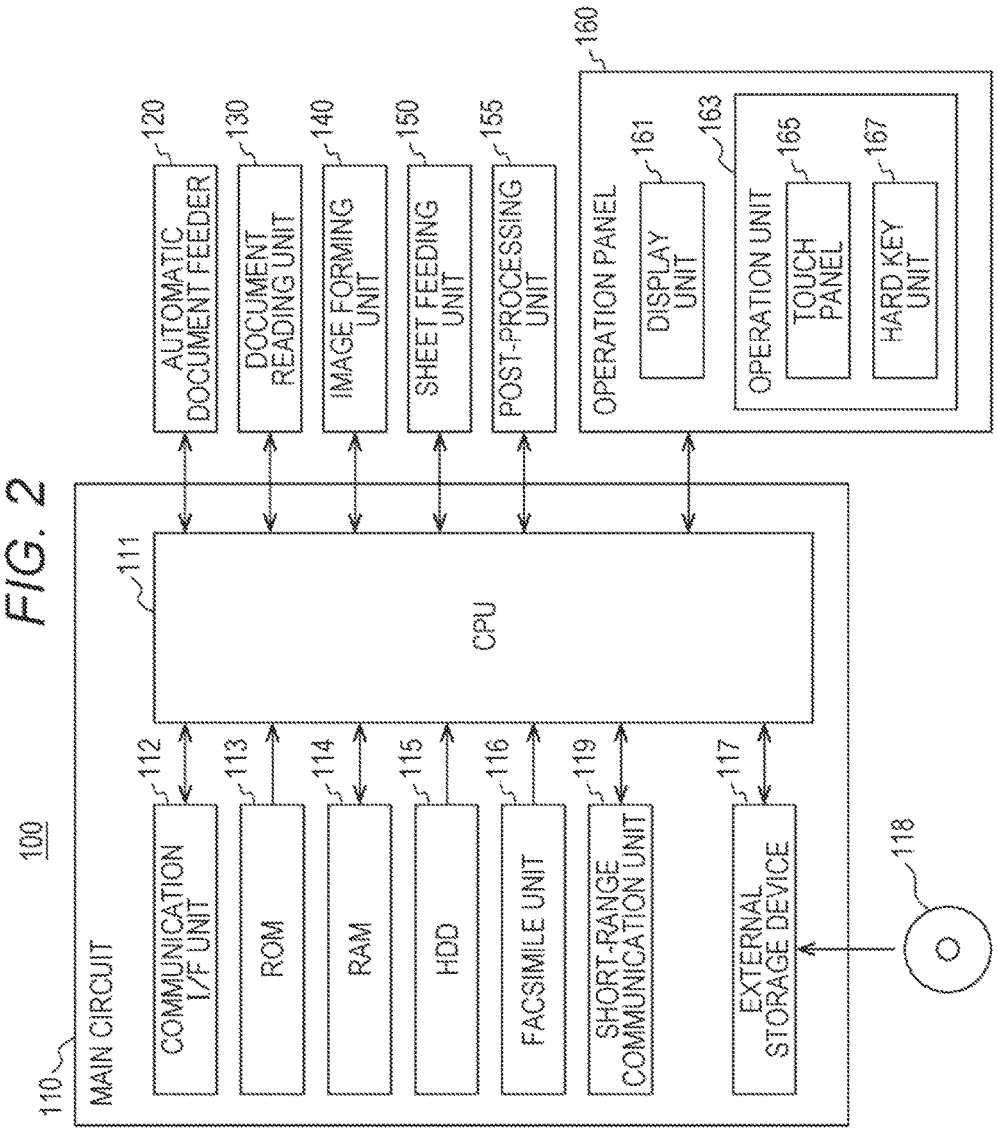
FIG. 2 is a block diagram illustrating an overview of a basic configuration of an MFP.

FIG. 2 is a block diagram illustrating an overview of the basic configuration of the MFP. Referring to FIG. 2, the MFP 100 is configured to include a main circuit 110, a document reading unit 130 for reading a document, an automatic document feeder 120 for conveying the document to the document reading unit 130, an image forming unit 140 for forming an image on a sheet or the like on the basis of image data which the document reading unit 130 acquires by reading the document and outputs, a sheet feeding unit 150 for feeding the sheet to the image forming unit 140, a post-processing unit 155 that processes the sheet on which the image is formed, and an operation panel 160 as a user interface.

The post-processing unit 155 executes a sorting process of sorting and discharging one or more sheets on which an image is formed by the image forming unit 140, a punching process of punching holes, and a stapling process of stapling the sheets.

The main circuit 110 is configured to include a CPU 111, a communication interface (I/F) unit 112, a ROM 113, a RAM 114, a hard disk drive (HDD) 115 as a mass storage device, a facsimile unit 116, an external storage device 117 mounted with a compact disk ROM (CD-ROM) 118, and a short-range communication unit 119. The CPU 111 is connected to the automatic document feeder 120, the document reading unit 130, the image forming unit 140, the sheet feeding unit 150, the post-processing unit 155, and the operation panel 160 to control the entire MFP 100.

The ROM 113 stores a program executed by the CPU 111 or data necessary for executing the program. The RAM 114 is used as a work area when the CPU 111 executes a program. Furthermore, the RAM 114 is configured to include a setting value storage area. The setting value storage area is an area for storing the setting value for executing the function. In addition, the RAM 114 temporarily stores the read data (image data) continuously transmitted from the document reading unit 130.

The communication I/F unit 112 is an interface for connecting the MFP 100 to the network 3. The CPU 111 communicates with other MFPs 100A and 100B or the mobile information devices 200, 200A and 200B though the communication I/F unit 112 and transmits and receives data. In addition, the communication I/F unit 112 can communicate with a computer connected to the Internet via the network 3.

The facsimile unit 116 is connected to the public switched telephone network (PSTN) to transmit facsimile data to the PSTN or receive facsimile data from the PSTN. The facsimile unit 116 stores the received facsimile data in the HDD 115 or outputs the facsimile data to the image forming unit 140. The image forming unit 140 prints the facsimile data received by the facsimile unit 116 on a sheet. In addition, the facsimile unit 116 converts the data stored in the HDD 115 into facsimile data and transmits the facsimile data to the facsimile device connected to the PSTN.

The short-range communication unit 119 performs wireless communication at a short distance. The short-range communication unit 119 communicates with any one of the mobile information devices 200, 200A, and 200B in a wireless manner on the basis of, for example, a generic access profile (GAP) of the Bluetooth (registered trademark) standard or the like. For example, if the distance between the mobile information device 200 and the short-range communication unit 119 becomes equal to or less than a communicable distance, the short-range communication unit 119 communicates with the mobile information device 200. The communicable distance of the short-range communication unit 119 is several meters. In addition, the short-range communication unit 119 may perform communication in a short-range wireless communication manner of near field communication (NFC). In this case, the communicable distance of the short-range communication unit 119 is several tens of centimeters.

The external storage device 117 is mounted with a CD-ROM 118. The CPU 111 can access the CD-ROM 118 through the external storage device 117. The CPU 111 loads the program recorded in the CD-ROM 118 mounted on the external storage device 117 on the RAM 114 and executes the program. In addition, the medium for storing the program executed by the CPU 111 is not limited to the CD-ROM 118, but the medium may be an optical disk (magnetic optical (MO) disc/mini disc (MD)/digital versatile disc (DVD)) or a semiconductor memory such as an IC card, a mask ROM, an erasable programmable ROM (EPROM), or an electrically EPROM (EEPROM).

In addition, the program executed by the CPU 111 is not limited to the program recorded in the CD-ROM 118, but the program stored in the HDD 115 may be loaded on the RAM 114 to be executed. In this case, another computer connected to the network 3 may rewrite the program stored in the HDD 115 of the MFP 100 or may add a new program and write the program. Furthermore, the MFP 100 may download a program from another computer connected to the network 3 and store the program in the HDD 115. The program described herein includes not only a program directly executable by the CPU 111 but also a source program, a compressed program, an encrypted program, and the like.

The operation panel 160 is provided on an upper surface of the MFP 100. The operation panel 160 is configured to include a display unit 161 and an operation unit 163. The display unit 161 is, for example, a liquid crystal display (LCD) and displays an instruction menu for the user, information on the acquired image data, and the like.

The operation unit 163 is configured to include a touch panel 165 and a hard key unit 167. The touch panel 165 is of an electrostatic capacitance type. In addition, the touch panel 165 is not limited to the electrostatic capacitance type, but for example, other types such as a resistive film type, a surface acoustic wave type, an infrared type, and an electromagnetic induction type may be used.

The detection surface of the touch panel 165 is provided so as to overlap the display unit 161 on the upper surface or the lower surface of the display unit 161. Herein, the size of the detection surface of the touch panel 165 is allowed to be the same as the size of the display surface of the display unit 161. Therefore, the coordinate system of the display surface and the coordinate system of the detection surface are the same. The touch panel 165 detects a position at which the user indicates the display surface of the display unit 161 on the detection surface and outputs the coordinate of the detected position to the CPU 111. Since the coordinate system of the display surface and the coordinate system of the detection surface are the same, the coordinate output by the touch panel 165 can be replaced with the coordinate of the display surface. Hereinafter, the coordinate that the touch panel 165 detects and outputs on the detection surface by the user indicating the display surface of the display unit 161 is also referred to as the coordinate of the display surface.

The hard key unit 167 is configured to include a plurality of hard keys. The hard key is, for example, a contact switch. The touch panel 165 detects the position indicated by the user on the display surface of the display unit 161. In many cases, since the user operates the MFP 100 in the posture that the user is upright, the display surface of the display unit 161, the operation surface of the touch panel 165, and the hard key unit 167 are arranged to face upward. This is because the user can easily view the display surface of the display unit 161 and can easily instruct the operation unit 163 with the user's fingers.

Figure 3:
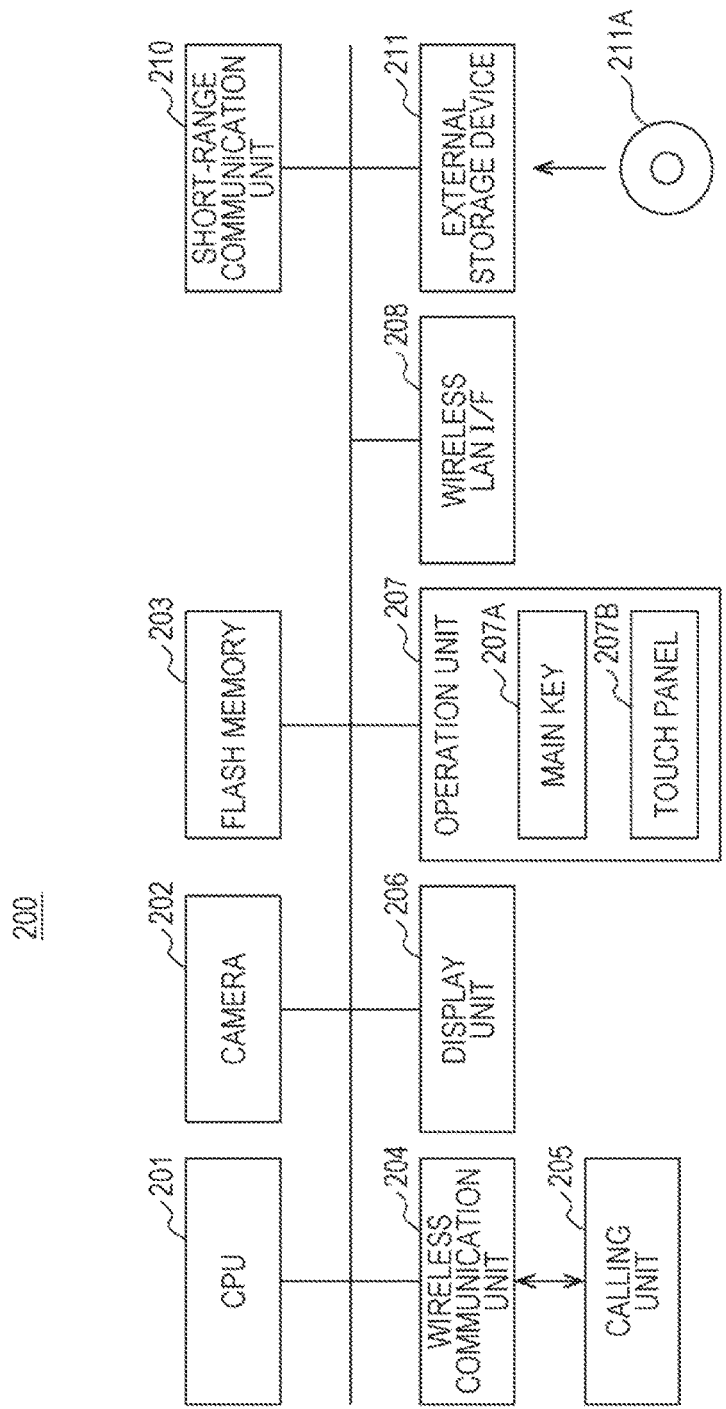
FIG. 3 is a block diagram illustrating an overview of a configuration of a mobile information device.

FIG. 3 is a block diagram illustrating an overview of the configuration of the mobile information device. Referring to FIG. 3, the mobile information device 200 according to the embodiment is configured to include a CPU 201 for controlling the entire mobile information device 200, a camera 202, a flash memory 203 for storing data in a nonvolatile manner, a wireless communication unit 204 connected to a calling unit 205, a display unit 206 for displaying information, an operation unit 207 for receiving user's operation, a wireless LAN I/F 208, a short-range communication unit 210, and an external storage device 211.

The display unit 206 is a display device such as a liquid crystal display (LCD), an organic ELD, or the like, and displays an image. The operation unit 207 is configured to include a main key 207A and a touch panel 207B. The touch panel 207B is of an electrostatic capacitance type. In addition, the touch panel 207B is not limited to the electrostatic capacitance type, but for example, other types such as a resistive film type, a surface acoustic wave type, an infrared type, and an electromagnetic induction type may be used.

The detection surface of the touch panel 207B is provided to overlap the display unit 206 on the upper surface or the lower surface of the display unit 206. Herein, the size of the detection surface of the touch panel 207B is allowed to be the same as the size of the display surface of the display unit 206. Therefore, the coordinate system of the display surface and the coordinate system of the detection surface are the same. The touch panel 207B detects a position at which the user indicates the display surface of the display unit 206 on the detection surface and outputs the coordinate of the detected position to the CPU 201. Since the coordinate system of the display surface and the coordinate system of the detection surface are the same, the coordinate output by the touch panel 207B can be replaced with the coordinate of the display surface. Hereinafter, the coordinate that the touch panel 207B detects and outputs on the detection surface by the user indicating the display surface of the display unit 206 is also referred to as the coordinate of the display surface.

The camera 202 is configured to include a lens and a photoelectric conversion element and focuses light condensed by the lens on the photoelectric conversion element, and the photoelectric conversion element photoelectrically converts the received light and outputs an image data to the CPU 201. The photoelectric conversion element is a complementary metal oxide semiconductor (CMOS) sensor, a charge coupled device (CCD) sensor, or the like.

The wireless communication unit 204 communicates with the mobile phone base station connected to a telephone communication network in a wireless manner. The wireless communication unit 204 connects the mobile information device 200 to the telephone communication network and enables a call using the calling unit 205. The wireless communication unit 204 decodes a voice signal obtained by demodulating a wireless signal received from the mobile phone base station and outputs the decoded voice signal to the calling unit 205. In addition, the wireless communication unit 204 encodes voice input from the calling unit 205 and transmits the encoded voice to the mobile phone base station. The calling unit 205 is configured to include a microphone and a speaker and outputs voice input from the wireless communication unit 204 from the speaker and outputs voice input from the microphone to the wireless communication unit 204. Furthermore, the wireless communication unit 204 is controlled by the CPU 201 to connect the mobile information device 200 to the e-mail server and send and receive e-mails.

The wireless LAN I/F 208 is an interface for communicating with the wireless station 5 and connecting the mobile information device 200 to the network 3. By registering internet protocol (IP) addresses of the MFPs 100, 100A, and 100B in mobile information device 200, the mobile information device 200 can communicate with the MFPs 100, 100A, and 100B and can transmit and receive data. In addition, in the embodiment, the case where the mobile information device 200 communicates with the MFPs 100, 100A, and 100B by using the wireless LAN I/F 208 will be described as an example, but communication can also be performed by using another communication method. More specifically, in a case where the mobile information device 200 and the MFPs 100, 100A, and 100B are provided with short-distance wireless devices such as Bluetooth (registered trademark), the mobile information device 200 may communicate with any one of the MFPs 100, 100A, and 100B in one-to-one communication manner.

The flash memory 203 stores a program executed by the CPU 201 or data necessary for executing the program. The CPU 201 loads the program recorded in the flash memory 203 on the RAM of the CPU 201 and executes the program.

The short-range communication unit 210 communicates with another device, for example, other mobile information devices 200A and 200B or the MFPs 100, 100A, and 100B in a wireless manner on the basis of the GAP of the Bluetooth (registered trademark) standard or the like. The short-range communication unit 208 communicates with the MFP 100, for example, if the distance to the MFP 100 is equal to or less than the communicable distance. The communicable distance of the short-range communication unit 210 is several meters. In addition, the short-range communication unit 210 may perform communication in the short-range wireless communication manner of NFC. In this case, the communicable distance of the short-range communication unit 210 is several tens of cm.

The external storage device 211 is attachable to and detachable from the mobile information device 200, and a CD-ROM 211A storing a remote operation program can be mounted on the external storage device. The CPU 201 can access the CD-ROM 211A through the external storage device 211. The CPU 201 can load and execute the remote operation program recorded in the CD-ROM 211A mounted on the external storage device 211 on the RAM of the CPU 201.

Although the program recorded in the flash memory 203 or the CD-ROM 211A has been described as a program to be executed by the CPU 201, a program obtaining by rewriting the program stored in the flash memory 203 or a new program obtained by additionally writing by other computers connected to the network 3 may be used. Furthermore, a program obtained by the mobile information device 200 downloading from another computer connected to the network 3 may be used. The program described herein includes not only a program directly executable by the CPU 201 but also a source program, a compressed program, an encrypted program, and the like.

In addition, the medium for storing the program executed by the CPU 201 is not limited to the CD-ROM 211A, but an optical disk (MO/MD/DVD), an IC card, an optical card, a semiconductor memory such as a mask ROM, an EPROM, and an EEPROM may be used.

Figure 4:
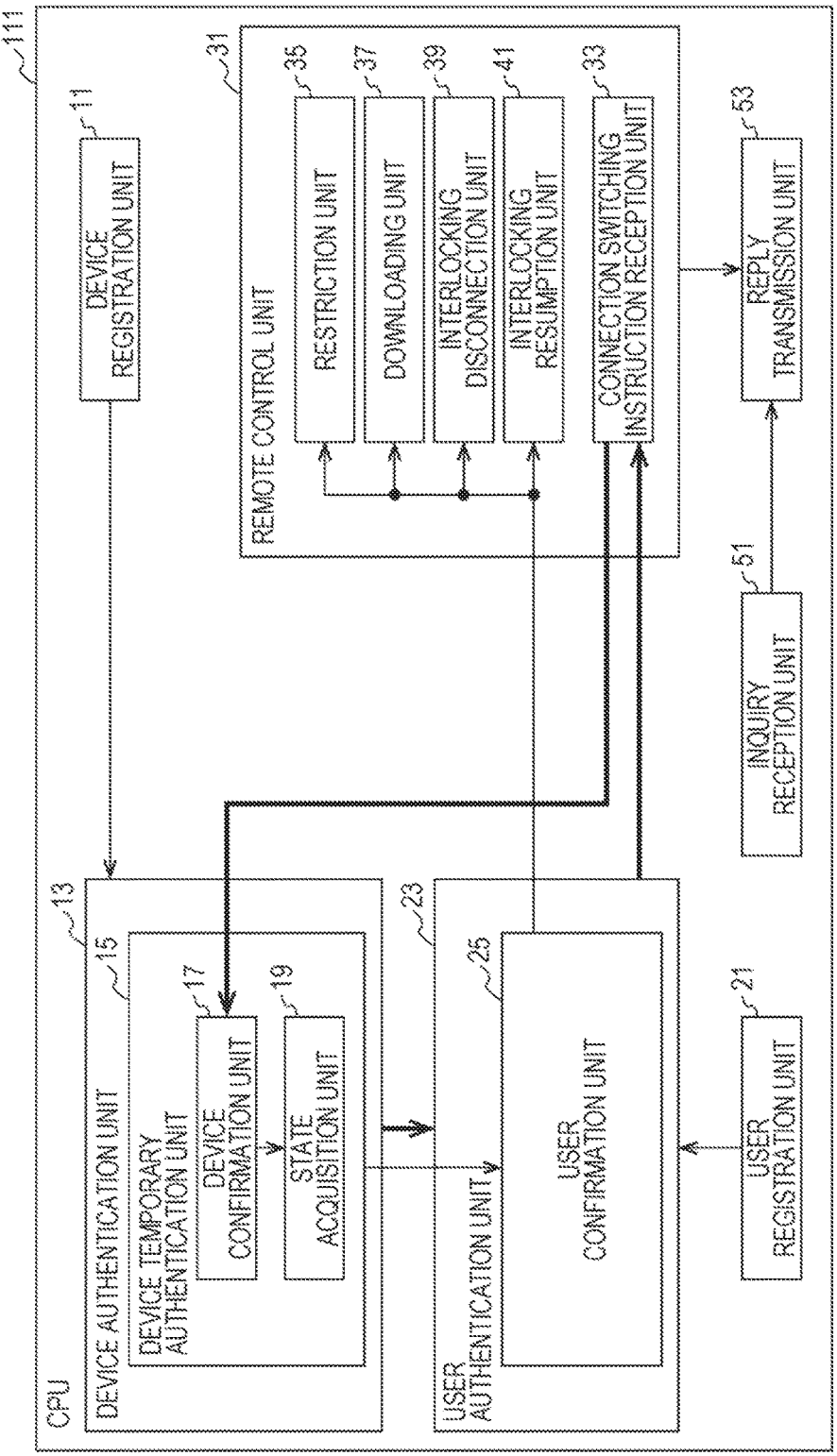
FIG. 4 is a block diagram illustrating an example of functions of a CPU included in an MFP according to the embodiment.

FIG. 4 is a block diagram illustrating an example of the functions of the CPU of the MFP according to the embodiment. The functions illustrated in FIG. 4 are functions that are formed in the CPU 111 by the CPU 111 of the MFP 100 executing a remote control program stored in the ROM 113, the HDD 115, and the CD-ROM 118.

Referring to FIG. 4, the CPU 111 is configured to include a device registration unit 11, a device authentication unit 13, a user registration unit 21, a user authentication unit 23, a remote control unit 31, an inquiry reception unit 51, and a reply transmission unit 53.

The device registration unit 11 registers a device that is defined in advance as a device connectable to the MFP 100. Hereinafter, the device registered by the device registration unit 11 is referred to as a registered device. The registered device which is registered in the MFP 100 is a device connected to remotely operate the MFP 100. The registered device which is registered in the MFP 100 is determined, for example, by a manager who manages the MFP 100. For example, if the manager inputs the device identification information and authentication information of the device to the operation unit 163, the device registration unit 11 registers a set of the device identification information and the authentication information received by the operation unit 163. More specifically, a device record including the device identification information and the authentication information is added to the device table stored in the HDD 116. The device identification information is, for example, a network address assigned to the device. The network address is, for example, an Internet protocol (IP) address or a media access control (MAC) address. The authentication information is information that is defined in advance between the registered device and the MFP 100.

The device authentication unit 13 authenticates the device connected to the MFP 100. More specifically, in a case where the communication I/F unit 112 or the short-range communication unit 119 receives a connection request for remote control, the device authentication unit 13 authenticates the device that has transmitted the connection request. In the following description, the case where the communication I/F unit 112 receives the connection request for remote operation will be described as an example. In response that the communication I/F unit 112 receives the connection request for remote operation, the device authentication unit 13 acquires the device identification information and the authentication information from the device that has transmitted the connection request and determines on the basis of the acquired device identification information and authentication information whether or not to authenticate. If a device record including the same device identification information and authentication information as the acquired set of the device identification information and the authentication information is included in the device table stored in the HDD 116, the device authentication unit 13 authenticates the device that has transmitted the connection request, but if such a device record is not included in the device table, the device authentication unit does not authenticate. In the case of authenticating the device, the device authentication unit 13 outputs the device identification information of the authenticated device to the user authentication unit 23 as indicated by thick arrows in FIG. 4. In addition, the distance from the MFP 100 is restricted by the device table, the distance to the device is calculated from the intensity of the radio wave when the communication I/F unit 112 receives the connection request, and it is determined whether or not the calculated distance is within a range of the restricted distance. In addition, in a case where the network is restricted by the device table, it is determined whether or not the network through which the communication I/F unit 112 has received the connection request is a restricted network.

In addition, the functions of the device registration unit 11 and the device authentication unit 13 may be included in another device different from the MFP 100. Another device may be one of the MFPs 100, 100A, and 100B or may be a server connected to the network 3. For example, in a case where the server has the functions of the device registration unit 11 and the device authentication unit 13, the server stores a registered device for each of the MFPs 100, 100A, and 100B. On the other hand, in a case where the communication I/F unit 112 or the short-range communication unit 119 receives the connection request for remote operation, the MFP 100 requests the server to authenticate the device that has transmitted the connection request and receives an authentication result from the server. If the server is requested to authenticate the device that has transmitted the connection request by the MFP 100, the server determines whether or not the device is registered as a registered device and returns the authentication result.

The user registration unit 21 registers a user who is defined in advance as a user who operates the MFP 100. Hereinafter, the user registered by the user registration unit 21 is referred to as a registered user. The registered users who are registered in the MFP 100 include a user who operates the MFP 100 by using the operation unit 163 and a user who remotely operates the MFP 100 by using the mobile information devices 200, 200A, and 200B to be described later. The registered users who are registered in the MFP 100 are determined, for example, by a manager who manages the MFP 100. For example, if the manager inputs the user identification information of the user and the authentication information for confirming that the registered user is a genuine user to the operation unit 163, the user registration unit 21 registers a set of the user identification information and the authentication information received by the operation unit 163. The authentication information is, for example, a password. In addition, the authentication information may be biometric information. More specifically, a user record including the user identification information and the authentication information is added to a user table stored in the HDD 116.

The user authentication unit 23 authenticates the user who remotely operates the MFP 100. The user authentication unit 23 is input with the device identification information of the authenticated device from the device authentication unit 13. The user authentication unit 23 authenticates the user who operates the device specified by the device identification information. More specifically, the user authentication unit 23 specifies the device of the device identification information input from the device authentication unit 13 among devices with which the communication I/F unit 112 communicates and acquires a set of user identification information and password from the specified device. For example, the case where the mobile information device 200 is authenticated by the device authentication unit 13 will be described as an example. The user authentication unit 23 transmits a login screen including an area for inputting the user identification information and the password to the mobile information device 200 through the communication I/F unit 112. The mobile information device 200 displays the login screen on the display unit 206 and receives the set of user identification information and password that the user inputs to the operation unit 207 in accordance with the login screen. Then, the mobile information device 200 transmits the received set of user identification information and password to the MFP 100 through the wireless LAN I/F 208. In a case where the set of user identification information and password is registered in advance in the mobile information device 200, the mobile information device 200 may transmit the set of user identification information and password to the MFP 100 in response to the communication connection with the MFP 100, in other words, in response to the authentication of the device by the device authentication unit 13. In this case, the user authentication unit 23 does not need to transmit the login screen to the mobile information device 200.

The user authentication unit 23 acquires the set of user identification information and password received by the communication I/F unit 112 from the mobile information device 200. If a user record including the same set of user identification information and password as the acquired set of user identification information and password is included in the user table stored in the HDD 116, the user authentication unit 23 authenticates a user who operates the mobile information device 200. If such a user record is not included in the device table, the user authentication unit does not authenticate the user. In a case where the user who operates the mobile information device 200 is authenticated, as indicated by thick arrows in FIG. 4, the user authentication unit 23 outputs the set of the device identification information input from the device authentication unit 13 and the user identification information of the authenticated user to the remote control unit 31.

In addition, the functions of the user registration unit 21 and the user authentication unit 23 may be included in another device different from the MFP 100. Another device may be one of the MFPs 100, 100A, and 100B or may be a server connected to the network 3. For example, in a case where the server has the functions of the user registration unit 21 and the user authentication unit 23, the server stores a registered user for each of the MFPs 100, 100A, and 100B. On the other hand, the MFP 100 requests the server to perform the user authentication of the user who operates the mobile information device 200 and receives an authentication result from the server. If the server is requested to perform the user authentication of the user who operates the mobile information device 200 from the MFP 100, the server determines whether or not the user is registered as a registered user and returns the authentication result.

In a case where the set of device identification information and user identification information is input from the user authentication unit 23, the remote control unit 31 permits a user specified by the user identification information to log in, handles the remote operation which the communication I/F unit 112 has received from the device specified by the device identification information as an operation by the user who is permitted to log in, and executes a process according to the remote operation. In other words, in a case where the communication I/F unit 112 is connected to a device registered in advance in the MFP 100 and a user who operates the device is authenticated, the remote control unit 31 controls a process according to the remote operation received from the device. Therefore, the remote control unit 31 does not execute a process according to the remote operation received from a device which is not registered in advance in the MFP 100. In addition, even in a case where the remote control unit receives a remote operation from a device which is registered in advance in the MFP 100, if a user who operates the device is not authenticated, the remote control unit does not execute the process according to the remote operation.

After the set of device identification information and user identification information is input from the user authentication unit 23, in a case where a remote operation indicating that the remote operation is to be ended is received, or in a case where the communication I/F unit 112 cannot communicate with the device specified by the device identification information, the remote control unit 31 determines that the user who operates the device specified by the device identification information and the user identification information has logged out and ends the remote operation by the user.

The remote control unit 31 is configured to include a connection switching instruction reception unit 33, a restriction unit 35, a downloading unit 37, an interlocking disconnection unit 39, and an interlocking resumption unit 41. In a case where the set of device identification information and user identification information is input from the user authentication unit 23 to the remote control unit 31, the device specified by the device identification information is set as a master device. The connection switching instruction reception unit 33 receives a remote operation indicating a connection switching instruction for switching the connection from the master device to the sub device. The connection switching instruction includes the device identification information of the sub device. In the case of receiving the remote operation indicating the connection switching instruction, the connection switching instruction reception unit 33 determines whether or not the sub device included in the connection switching instruction is registered by the device registration unit 11. More specifically, the connection switching instruction reception unit 33 controls the communication I/F unit 112 to communicate with the sub device and acquires authentication information necessary for device authentication from the sub device. The connection switching instruction reception unit 33 determines, on the basis of the device identification information of the sub device and the acquired authentication information, whether or not the sub device is registered by the device registration unit 11. In a case where it is determined that the sub device is not registered, as indicated by thick arrows in FIG. 4, the connection switching instruction reception unit 33 outputs a temporary authentication instruction including the device identification information of the sub device and the device identification information of the master device to the device authentication unit 13.

The device authentication unit 13 is configured to include a device temporary authentication unit 15. The device temporary authentication unit 15 temporarily authenticates the sub device in a case where it is confirmed that the master device remotely operates the duplicate login device. The device temporary authentication unit 15 is configured to include a device confirmation unit 17 and a state acquisition unit 19. In response to the input of the temporary authentication instruction from the connection switching instruction reception unit 33, the device confirmation unit 17 confirms whether or not the duplicate login device is remotely operated by the master device. The duplicate login device is a device other than the MFP 100 that is remotely operated by the master device.

Figure 5:
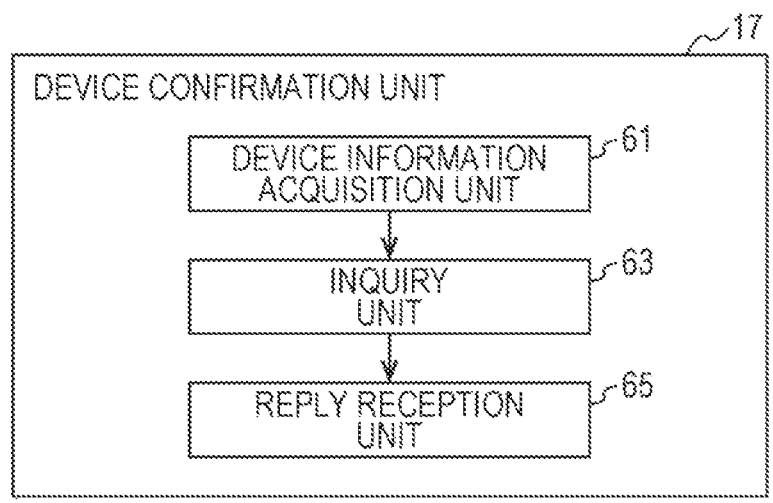
FIG. 5 is a diagram illustrating an example of detailed functions of a device confirmation unit.

FIG. 5 is a diagram illustrating an example of detailed functions of the device confirmation unit. Referring to FIG. 5, the device confirmation unit 17 is configured to include a device information acquisition unit 61, an inquiry unit 63, and a reply reception unit 65. The device information acquisition unit 61 acquires the duplicate login device information from the master device. The device information acquisition unit 61 controls the communication I/F unit 112 to communicate with the master device and inquiries about the duplicate login device. In a case where there is an inquiry from the MFP 100 about the duplicate login device, if there is a device other than the MFP 100 that remotely operates, the master device returns the device identification information of the device. In a case where the communication I/F unit 112 receives the device identification information of the duplicate login device from the master device, the device confirmation unit 17 transmits an inquiry instruction including the device identification information of the master device and the received device identification information of the duplicate login device to the inquiry unit 63.

In response to the input of the inquiry instruction from the device information acquisition unit 61, the inquiry unit 63 controls the communication I/F unit 112 to communicate with the duplicate login device and inquires of the duplicate login device whether or not the duplicate login device is remotely operated by the master device. More specifically, by using the device identification information of the duplicate login device included in the inquiry instruction, the inquiry unit controls the communication I/F unit 112 to communicate with the duplicate login device to transmit the inquiry information to the duplicate login device and output a reception instruction to the reply reception unit 65. The inquiry information includes the device identification information of the master device. The reception instruction includes the device identification information of the duplicate login device.

The duplicate login device determines whether or not the duplicate login device is remotely operated by the master device and returns a determination result. After a reception instruction from the inquiry unit 63 is input, the reply reception unit 65 controls the communication I/F unit 112 to receive the determination result from the duplicate login device. The determination result is any one of the case indicating that duplicate login device is remotely operated by the master device and the case indicating that the duplicate login device is not remotely operated by the master device.

For example, in a case where the MFPs 100, 100A, and 100B are in a predetermined reliable relationship such as the case of being managed by the same manager, it is confirmed to the duplicate login device that the master device logs in, so that it is possible to exclude an operation of the master device by an unauthorized user.

Returning to FIG. 4, in a case where the determination result received from the duplicate login device indicates that the duplicate login device is remotely operated by the master device, the device confirmation unit 17 outputs the device identification information of the duplicate login device to the state acquisition unit 19. The state acquisition unit 19 controls the communication I/F unit 112 to communicate with the duplicate login device and acquires screen identification information for identifying a first operation screen which the duplicate login device transmits to the master device.

The device temporary authentication unit 15 compares the first operation screen specified by the screen identification information acquired by the state acquisition unit 19 with a second operation screen transmitted by the remote control unit 31 for the master device. On the condition that the first operation screen and the second operation screen are in a predetermined relationship, the device temporary authentication unit permits authentication of the sub device, but if the first operation screen and the second operation screen are not in a predetermined relationship, the device temporary authentication unit does not permit the authentication of the sub device. Since the authentication of the sub device is permitted on the condition that the first operation screen and the second operation screen are in a predetermined relationship, the first operation screen is displayed on the master device, and the second Since the operation screen is displayed, so that the remote operation using the sub device can be restricted.

In a case where a plurality of the operation screens that can be displayed by the MFP 100 are classified into any one of a plurality of categories, the predetermined relationship is a relationship in which the first operation screen and the second operation screen belong to the same category. In addition, in a case where a plurality of the operation screens that can be displayed by the MFP 100 are classified into any one of a plurality of hierarchies, if there is a higher hierarchy than the hierarchy of the hierarchy to which the operation screen belongs, each of the operation screens is associated with one or more of the operation screens classified into a plurality of operation screens. In a case where a plurality of the operation screens that can be displayed by the MFP 100 are classified into any one of a plurality of hierarchies, the same operation screens as the operation screens associated with higher hierarchies may be set as the operation screens belonging to the same category. In this case, if the operation screen of a higher hierarchy associated with the first operation screen is the same as the operation screen of a higher hierarchy associated with the second operation screen, the device temporary authentication unit 15 determines that the first operation screen and the second operation screen belong to the same category.

In addition, the predetermined relationship may be a relationship where a mode in which the first operation screen is used and a mode in which the second operation screen is used are the same. In some cases, the MFP 100 assigns one of a plurality of security levels to an authenticated user, and the MFP 100 permits setting within a range of the authority determined by the security level assigned to the authenticated user. The mode indicates the state of the MFP 100 that the MFP 100 permits setting within a range of the authority determined by the security level assigned to the authenticated user. The mode includes, for example, a box manager mode, a destination manager mode, a network setting manager mode, a security manager mode, and a manager mode. The box manager mode is a state restricted to setting for box management. The destination manager mode is a state restricted to setting for destination management. The network manager mode is a state restricted to setting for network management. The security setting mode is a state restricted to setting for security. The manager mode is a state in which the range in which setting is permitted is not restricted. In a case where the mode in which the first operation screen is used is, for example, the box manager mode, if the second operation screen is any one of one or more operation screens displayed in the box manager mode, the device temporary authentication unit 15 determines that the mode in which the first operation screen is used is the same as the mode in which the second operation screen is used.

In addition, the predetermined relationship may be a relationship where the first operation screen and the second operation screen are the same.

In a case where the device confirmation unit 17 determines that the duplicate login device is remotely operated by the master device, if the first operation screen specified by the screen identification information acquired by the state acquisition unit 19 and the second operation screen transmitted by the remote control unit 31 for the master device are in a predetermined relationship, the device temporary authentication unit 15 enables the authentication of the sub device. In a case where the communication I/F unit 112 receives a connection request for remote control from the sub device while the authentication of the sub device is enabled, the device temporary authentication unit 15 authenticates the sub device and outputs the device identification information of the sub device to the user authentication unit 23, as illustrated by thin arrows in FIG. 4.

In addition, in a case where the device confirmation unit 17 determines that the duplicate login device is remotely operated by the master device, regardless of whether or not the first operation screen and the second operation screen are in a predetermined relationship, the device temporary authentication unit 15 may enable the authentication of the sub device. For example, a switching mode which is set by a user managing the MFP 100 in advance and is set to any one of a screen restriction mode and a screen non-restriction mode is provided. In a case where the switching mode is set to the screen non-restricting mode, if the device confirmation unit 17 determines that the duplicate login device is remotely operated by the master device, regardless of whether or not the first operation screen and the second operation screen are in a predetermined relationship, the authentication of the sub device may be enabled. In addition, in a case where the switching mode is set to the screen restricting mode, if the device confirmation unit 17 determines that the duplicate login device is remotely operated by the master device, the device temporary authentication unit 15 enables the authentication of the sub device on the condition that the first operation screen and the second operation screen are in a predetermined relationship.

The user authentication unit 23 authenticates the user who operates the sub device after the device identification information of the sub device is input from the device temporary authentication unit 15. More specifically, the user authentication unit 23 acquires a set of user identification information and password from the sub device with which the communication I/F unit 112 communicates. The user authentication unit 23 transmits a login screen including an area for inputting user identification information and password to the sub device through the communication I/F unit 112. The sub device displays the login screen and receives a set of user identification information and password that the user inputs to the sub device in accordance with the login screen and transmits the received set of user identification information and password to the MFP 100.

The user authentication unit 23 acquires the set of user identification information and password received by the communication I/F unit 112 from the sub device. If a user record including the same set of user identification information and password as the acquired set of user identification information and password is included in the user table stored in the HDD 116, the user authentication unit 23 authenticates the user who operates the sub device. If such a user record is not included in the device table, the user authentication unit does not authenticate the user. In addition, in a case where a registered user is registered in another device different from the MFP 100, for example, in a server, the user authentication unit 23 requests the server to perform the user authentication and acquires an authentication result from the server.

The user authentication unit 23 is configured to include a user confirmation unit 25. The user confirmation unit 25 compares the user who operates the master device with the user who operates the sub device. In a case where the user who operates the master device and the user who operates the sub device are the same, as indicated by thin arrows in FIG. 4, the user confirmation unit outputs a set of the device identification information of the sub device input from the device temporary authentication unit 15 and the user identification information of the authenticated user to the remote control unit 31.

In addition, the user authentication unit 23 may not include the user confirmation unit 25. In this case, in the case of authenticating the user who operates the sub device, regardless of whether or not the user who operates the master device and the user who operates the sub device are the same, the user authentication unit 23 outputs a set of the device identification information of the sub device input from the device temporary authentication unit 15 and the user identification information of the authenticated user to the remote control unit 31.

After the set of device identification information and user identification information is input from the user authentication unit 23, the remote control unit 31 permits the user specified by the user identification information to log in and handles the remote operation which the communication I/F unit 112 has received from the sub device specified by the device identification information as an operation by the user who is permitted to log in, and executes a processing according to the remote operation.

The restriction unit 35 of the remote control unit 31 restricts the process that is executable according to the remote operation received from the sub device. More specifically, the restriction unit 35 restricts the process that is executable according to the remote operation that the communication I/F unit 112 receives from the sub device specified by the device identification information to the process that is executable within a range of the authority determined by the security level assigned in advance to the user specified by the user identification information input from the user authentication unit 23. More specifically, in a case where a security level corresponding to a box management mode is assigned to the user who operates the sub device, a box manager mode is set, and only a process of setting for box management can be allowed to be executed. In addition, in a case where a security level of destination management is assigned, a destination manager mode is set, and only a process of setting for destination management can be allowed to be executed. In a case where a security level of a network manager is assigned, a network manager mode is set, and only a process for setting for network management can be allowed to be executed. In a case where a security level of security setting is assigned, a security manager mode and only the process for setting for security management can be allowed to be executed. In a case where a security level of the manager is assigned, all processes can be allowed to be executed without restricting executable processes.

In a case where the process specified by the remote operation received from the sub device is a process of downloading the data, the downloading unit 37 transmits the data to the master device without transmitting the data to the sub device. In a case where the communication I/F unit 112 disconnects the connection with the master device, the downloading unit reconnects with the master device and transmits the data to the master device.

In a case where the remote operation of the duplicate login device by the master device is ended, the interlocking disconnection unit 39 ends the remote operation by the sub device. More specifically, by inquiring the state of the remote operation of any one of the master device and the duplicate login device at a predetermined time interval, it is detected whether or not the remote operation of the duplicate login device by the master device is ended. In response to detecting the end of the remote operation of the duplicate login device by the master device, the interlocking disconnection unit 39 disconnects the communication path established by the communication I/F unit 112 with the sub device.

In addition, if a predetermined time elapses without the master device starting the remote operation of another MFP after the master device detects the end of the remote operation of the duplicate login device, the interlocking disconnection unit 39 allows the communication I/F unit 112 to disconnect the communication path established with respect to the sub device. In a case where the master device starts a remote operation of another MFP until a predetermined time elapses after the master device detects the end of the remote operation of the duplicate login device, the interlocking disconnection unit 39 allows the communication I/F unit 112 not to disconnect the communication path established with respect to the sub device.

In response to the input of the set of device identification information and user identification information from the user authentication unit 23, the interlocking resumption unit 41 disconnects the communication path established by the communication I/F unit 112 with respect to the master device and maintains the communication path established by the communication I/F unit 112 with respect to the sub device. After that, if the remote operation by the sub device is ended, the interlocking resumption unit 41 disconnects the communication path established by the communication I/F unit 112 with respect to the sub device. After that, the interlocking resumption unit establishes a new communication path with the master device. Therefore, the remote operation can be executed by any one of the master device and the sub device.

In a case where the communication I/F unit 112 receives the inquiry information from any of the other MFPs 100A and 100B, the inquiry reception unit 51 outputs the inquiry information to the reply transmission unit 53. The reply transmission unit 53 determines whether or not the user who operates the device specified by the device identification information included in the inquiry information is permitted to log in by the remote control unit 31. More specifically, in a case where the device specified by the device identification information included in the inquiry information is authenticated by the device authentication unit 13 and the user who operates the device specified by the device identification information included in the inquiry information is authenticated by the user authentication unit 23, the reply transmission unit 53 determines that the user who operates the device specified by the device identification information included in the inquiry information is permitted to log in by the remote control unit 31. The reply transmission unit 53 returns a determination result to the device that has transmitted the inquiry information through the communication I/F unit 112.

Figure 6:
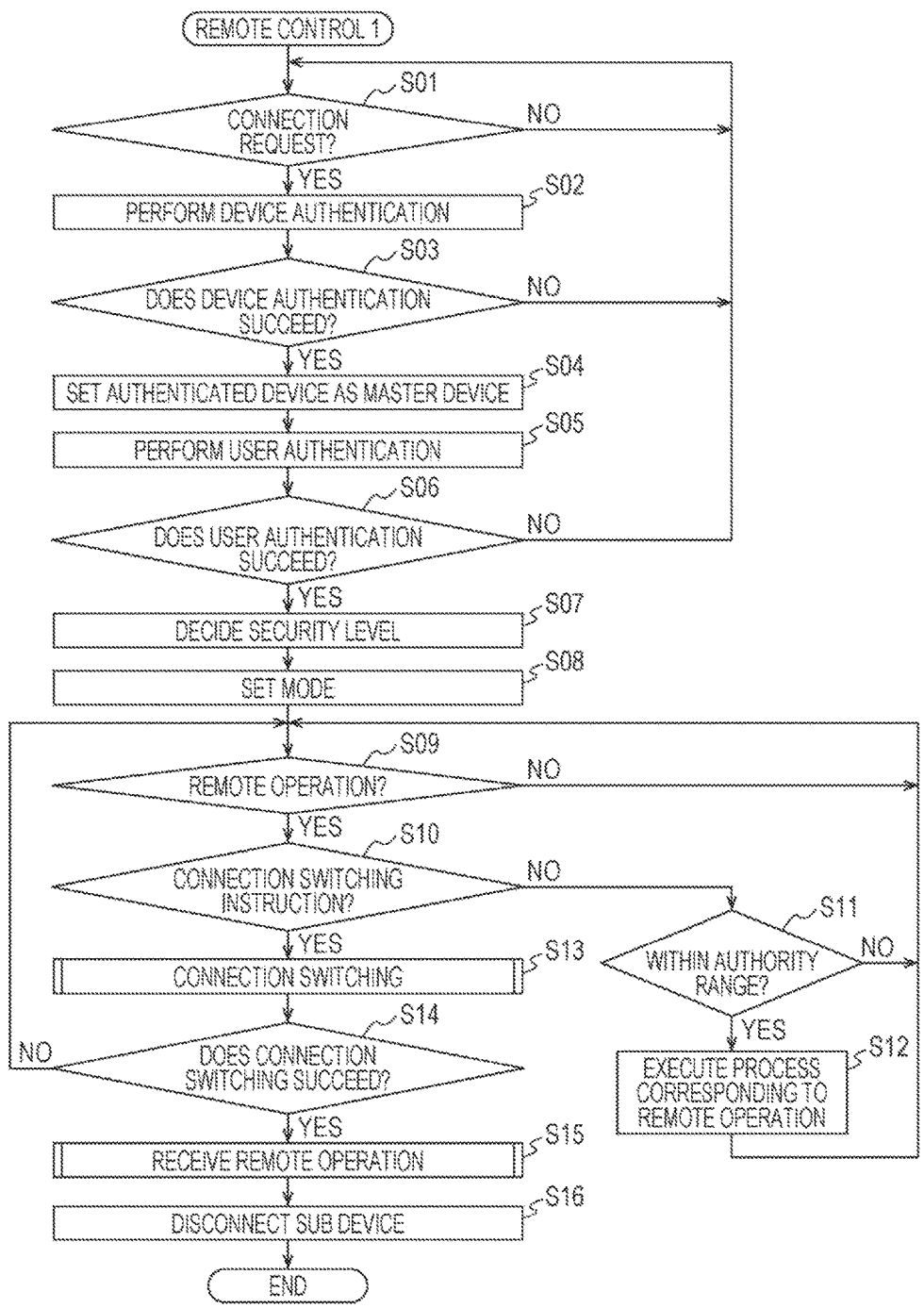
FIG. 6 is a flowchart illustrating an example of a flow of a remote control process.

FIG. 6 is a flowchart illustrating an example of the flow of remote control process. The remote control process is a process executed by the CPU 111 by the CPU 111 provided to the MFP 100 executing a remote control program stored in the ROM 113, the HDD 115, and the CD-ROM 118. Referring to FIG. 6, the CPU 111 determines whether or not a connection request has been received (step S01). It is determined whether or not the communication I/F unit 112 has received the connection request from any of the mobile information devices 200, 200A, and 200B. Until the connection request is received, a standby state maintains (NO in step S01). If the connection request is received (YES in step S01), the process proceeds to step S02. Herein, the case where the connection request is received from the mobile information device 200 will be described as an example.

In step S02, authentication of the device that has transmitted the connection request, herein, the mobile information device 200, is perform. More specifically, device identification information and authentication information are acquired from the mobile information device 200, and if a device record including the same device identification information and authentication information as the acquired device identification information and authentication information is included in the device table stored in the HDD 116, the device is authenticated. However, if such a device record is not included in the device table, the device is not authenticated. In addition, in a case where a registered device is registered in another device different from the MFP 100, for example, a server, the server is requested to perform the device authentication of the mobile information device 200, and an authentication result is acquired from the server. In the next step S03, in a case where the device authentication succeeds, the process proceeds to step S04. If not, the process returns to step S01. In a case where the device authentication fails, the mobile information device 200 may be notified that the authentication has failed.

In step S04, the authenticated mobile information device 200 is set as a master device, and the process proceeds to step S05. In step S05, authentication of the user is performed. More specifically, a login screen is transmitted to the authenticated mobile information device 200 through the communication I/F unit 112, and a set of user identification information and password input by a user A who operates the mobile information device 200 in accordance with the login screen is acquired. If a user record including the same set of user identification information and password as the set of user identification information and password received from the mobile information device 200 is included in the user table stored in the HDD 116, the user who operates the mobile information device 200 is authenticated. If such a user record is not included in the device table, the user is not authenticated. In addition, in a case where a registered user is registered in another device different from the MFP 100, for example, in a server, the server is requested to perform the user authentication, and an authentication result is acquired from the server. In this case, a security level assigned to the user authenticated by the server is also acquired from the server.

In the next step S06, if the user authentication succeeds, the process proceeds to step S07. If not, the process proceeds to step S01. In a case where the user authentication fails, the mobile information device 200 may be notified that the authentication of the user has failed.

In the next step S07, the security level assigned to the authenticated user A in step S06 is decided. Then, the mode is set to the mode corresponding to the decided security level. For example, if the security level of the manager is assigned to the user A, a manager mode is set.

In the next step S09, it is determined whether or not the remote operation has been received. Until the communication I/F unit 112 receives the remote operation from the mobile information device 200, a standby state maintains (NO in step S09). If the remote operation is received (YES in step S09), the process proceeds to step S10. In step S10, it is determined whether or not the remote operation received in step S09 indicates a connection switching instruction. If a remote operation indicating the connection switching instruction is received, the process proceeds to step S13. If not, the process proceeds to step S11.

In step S11, it is determined whether or not the process corresponding to the remote operation received in step S09 is within the authority range. The mode is set in step S08 for the security level decided in step S07. In the set mode, it is determined whether or not the process corresponding to the remote operation received in step S09 is executable. If the process is executable, the process proceeds to step S12. If not, the process returns to step S09. In a case where the process returns to step S09, it may be notified to the user A who operates the mobile information device 200 that the process is not executable according to the remote operation. In step S12, the process corresponding to the remote operation is executed, and the process returns to step S09.

In step S13, the connection switching process is executed, and the process proceeds to step S14. Although the details thereof are described later, the connection switching process is a process of switching the remotely-operated device from the mobile information device 200 that is a master device to the sub device specified by the device identification information included in the connection switching instruction. Herein, the case where the connection switching instruction includes the device identification information of the mobile information device 200A as the device identification information of the sub device will be described as an example.

In step S14, it is determined whether or not switching to the sub device has succeeded. If the switching to the sub device succeeds, the process proceeds to step S15. If not, the process returns to step S09. In step S15, a remote operation reception process is executed, and the process proceeds to step S16. The details of the remote operation reception process, which will be described later, is a process of receiving and executing a remote operation from the sub device. In step S16, the communication path established with respect to the sub device is disconnected, and the process is ended.

Figure 7:
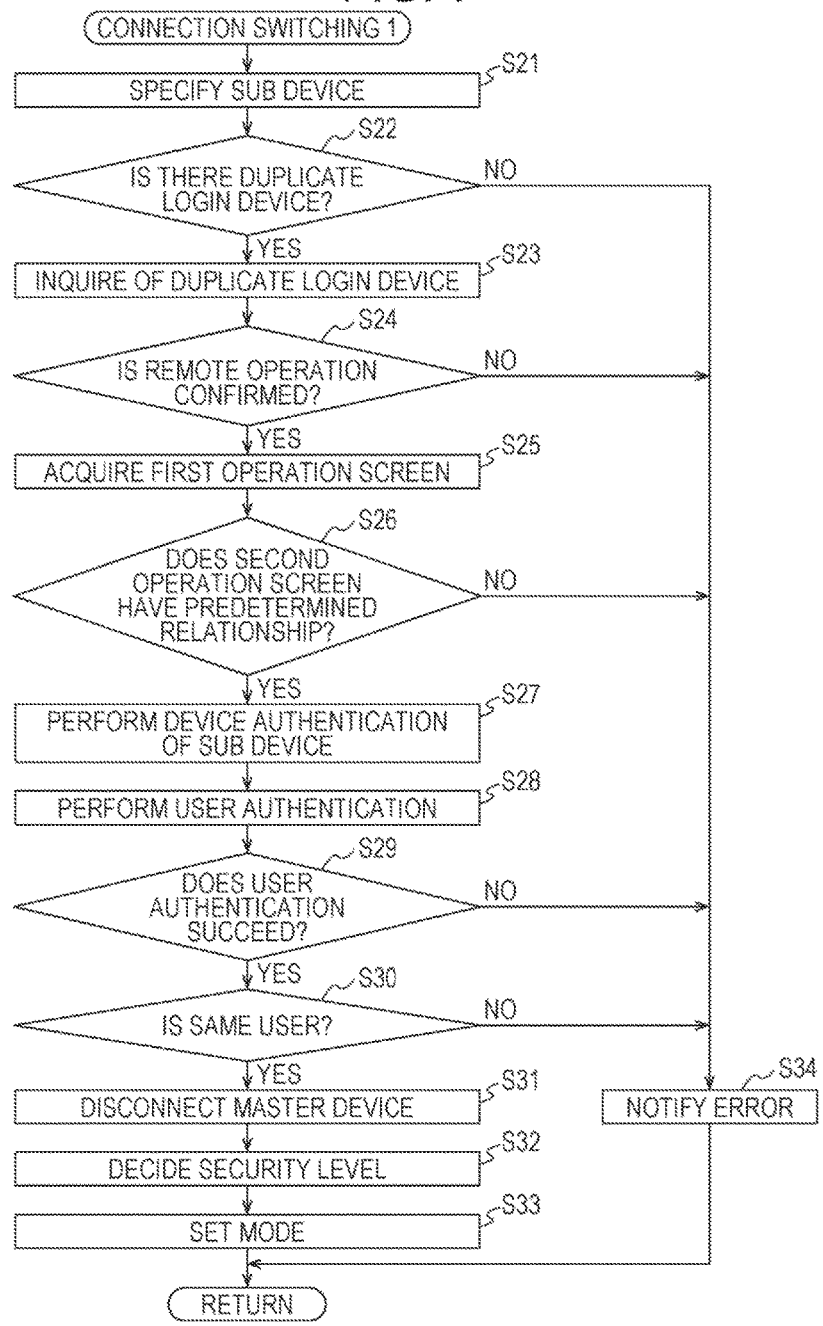
FIG. 7 is a flowchart illustrating an example of a flow of connection switching process.

FIG. 7 is a flowchart illustrating an example of the flow of the connection switching process. The connection switching process is a process executed in step S13 in FIG. 6. Referring to FIG. 7, the CPU 111 specifies a sub device (step S21). The device specified by the device identification information included in the connection switching instruction that is a remote operation received from the mobile information device 200 in step S09 in FIG. 6 is specified as a sub device. Herein, the mobile information device 200 is specified as a sub device.

In the next step S22, it is determined whether or not there is a duplicate login device. The duplicate login device is a device remotely operated by the master device and is a device other than the MFP 100. For example, by inquiring of the master device, it is determined whether or not there is a duplicate login device. More specifically, the communication I/F unit 112 is controlled to inquire of the mobile information device 200 that is a master device that there exists the duplicate login device. If there exists a device other than the MFP 100 that is remotely operated, the mobile information device 200 transmits the device identification information of the device. Therefore, if the device identification information of the duplicate login device is received from the mobile information device 200, the process proceeds to step S23. If not, the process proceeds to step S34. In step S34, an error is notified to the mobile information device 200, and the process returns to the remote control process. Herein, the case where the mobile information device 200 remotely operates the MFP 100A in addition to the MFP 100 will be described as an example. In this case, the duplicate login device is the MFP 100A, and the mobile information device 200 that is a master device returns the device identification information of the MFP 100A to the MFP 100.

In step S23, the duplicate login device is inquired whether or not the duplicate login device is remotely operated by the master device. In this case, the MFP 100A that is a duplicate login device is inquired. More specifically, by controlling the communication I/F unit 112 to communicate with the MFP 100A that is a duplicate login device and transmitting an inquiry signal including the device identification information of the mobile information device 200 that is a master device to the MFP 100A, it is inquired whether or not the MFP 100A is remotely operated by the mobile information device 200 that is a master device. Since the MFP 100A returns a signal indicating whether or not the MFP 100A is remotely operated by the mobile information device 200 that is a master device, in the next step S24, the process is branched on the basis of the signal received from the MFP 100A that is a duplicate login device. If the MFP 100A is remotely operated by the mobile information device 200, the process proceeds to step S25. If not, the process proceeds to step S34.

In step S25, a first operation screen is acquired. The first operation screen is an operation screen that the MFP 100A that is a duplicate login device transmits to the mobile information device 200 that is a master device. By controlling the communication I/F unit 112 to communicate with the MFP 100A that is a duplicate login device, the first operation screen is acquired from the MFP 100A.

In the next step S26, it is determined whether or not the second operation screen transmitted to the mobile information device 200 that is a master device has a predetermined relationship with the first operation screen acquired in step S25. If the second operation screen has a predetermined relationship with the first operation screen, the process proceeds to step S27. If not, the process proceeds to step S34. For example, if the first operation screen and the second operation screen are in the same category, it is determined that the operation screens are in a predetermined relationship. In addition, if the first operation screen and the second operation screen are displayed in the same mode, it may be determined that the operation screens are in a predetermined relationship. Furthermore, if the first operation screen and the second operation screen are the same, it may be determined that the operation screens are in a predetermined relationship.

In step S27, the mobile information device 200A that is a sub device is authenticated. More specifically, in a case where the communication I/F unit 112 receives a connection request for remote control from the mobile information device 200A that is a sub device, the mobile information device 200A is authenticated. In addition, in a case where a registered device is registered in another device different from the MFP 100, for example, in a server, the server is requested to perform the device authentication of the mobile information device 200A, and an authentication result is acquired from the server. In the next step S28, the user who operates the mobile information device 200A that is a sub device is authenticated. More specifically, a login screen is transmitted to the mobile information device 200A through the communication I/F unit 112, and a user A who operates the mobile information device 200A acquires a set of user identification information and password input in accordance with the login screen. If a user record including the same set of user identification information and password as the set of user identification information and password received from the mobile information device 200A is included in the user table stored in the HDD 116, the user A who operates the mobile information device 200A is authenticated. But, if such a user record is not included in the device table, the mobile information device is not authenticated. In addition, in a case where a registered user is registered in another device different from the MFP 100, for example, in a server, the server is requested to perform the user authentication of the user who operates the mobile information device 200A, and an authentication result is acquired from the server. In this case, a security level assigned to the user authenticated by the server is also acquired from the server.

In the next step S29, if the user authentication succeeds, the process proceeds to step S30. If not, the process proceeds to step S34. In a case where the user authentication fails, the mobile information device 200 may be notified that the authentication of the user has failed.

In step S30, it is determined whether or not the user who operates the master device and the user who operates the sub device are the same. If the user authenticated in step S05 of the remote control process is the same as the user authenticated in step S28, the process proceeds to step S31. If not, the process proceeds to step S34.

In step S31, the communication I/F unit 112 disconnects the communication path established with respect to the mobile information device 200 that is a master device, and the process proceeds to step S32. In step S32, the security level assigned to the authenticated user A in step S28 is determined. Then, the mode is set to the mode corresponding to the determined security level (step S33), and the process returns to the remote control process. For example, if the security level corresponding to the authority of the manager is assigned to the user A, the manager mode is set.

Figure 8:
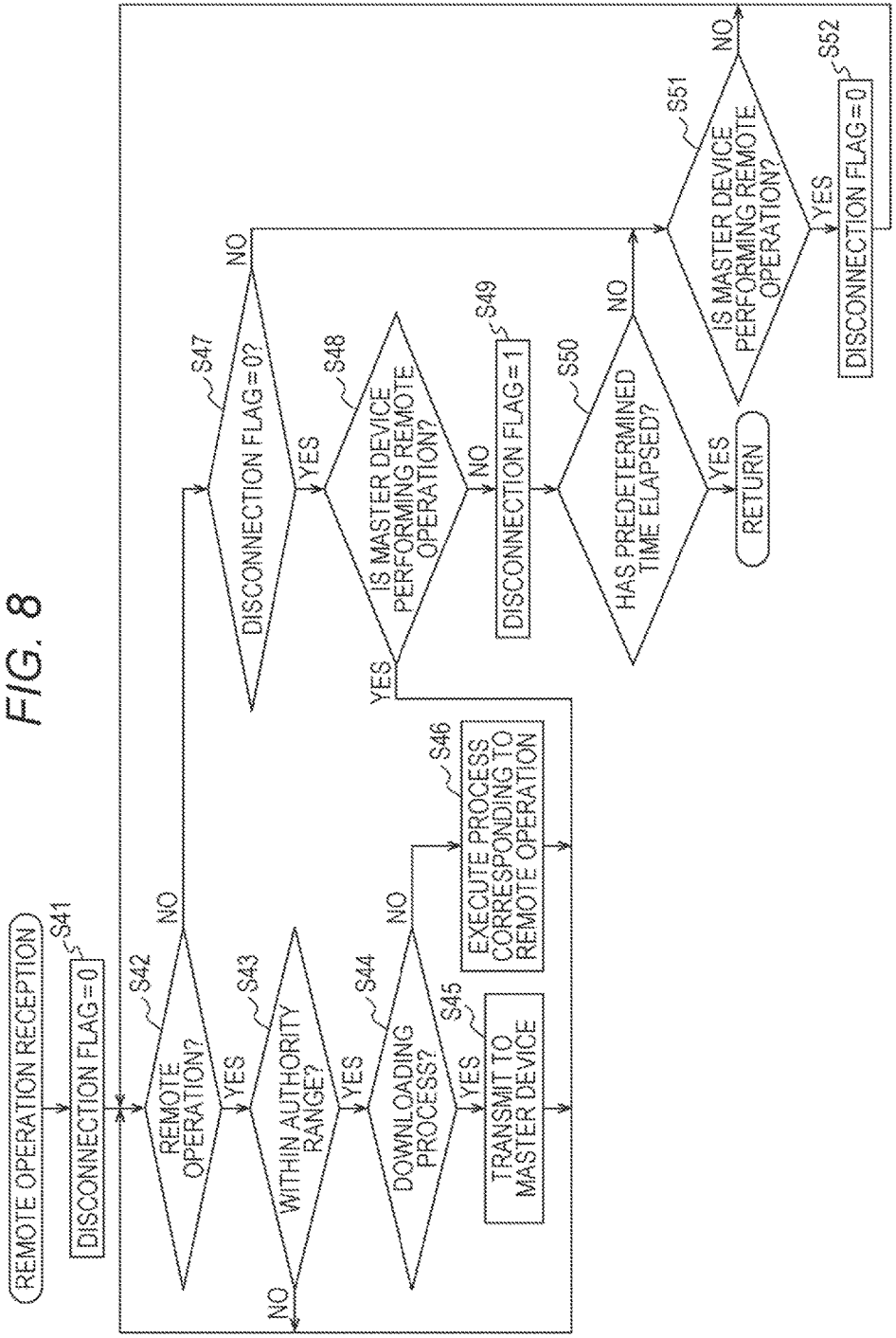
FIG. 8 is a flowchart illustrating an example of a flow of a remote operation reception process.

FIG. 8 is a flowchart illustrating an example of the flow of the remote operation reception process. The remote operation reception process is a process executed in step S15 in FIG. 6. Referring to FIG. 8, the CPU 111 sets a disconnection flag to "0" (step S41). The disconnection flag indicates whether or not the mobile information device 200 that is a master device remotely operates the MFP 100A that is a duplicate login device. If the mobile information device 200 remotely operates the MFP 100, the disconnection flag is set to "0". If the mobile information device 200 ends the remote operation of the MFP 100, the disconnection flag is set to "1".

In the next step S42, it is determined whether or not the communication I/F unit 112 has received a remote operation from the mobile information device 200A that is a sub device. If a remote operation is received, the process proceeds to step S43. If not, the process proceeds to step S47.

In step S43, it is determined whether or not the process corresponding to the remote operation received in step S42 is within the authority range. The mode is set in step S33 for the security level determined in step S32 of the connection switching process. In the set mode, it is determined whether or not the process corresponding to the remote operation received in step S42 is executable. If the process is executable, the process proceeds to step S44. If not, the process returns to step S42. In a case where the process returns to step S42, it may be notified to the user A who operates the mobile information device 200A that the process is not executable according to the remote operation.

In step S44, it is determined whether or not the process corresponding to the remote operation received in step S42 is a downloading process. If the process corresponding to the remote operation is the downloading process, the process proceeds to step S45. If not, the process proceeds to step S46. In step S46, the process corresponding to the remote operation is executed, and the process returns to step S42.

In step S45, the data to be transmitted is transmitted to the mobile information device 200 that is a master device, and the process returns to step S42. The user A who has operated the MFP 100 by using the mobile information device 200 that is a master device switches to the mobile information device 200A that is a sub device to remotely operate the MFP 100A by using mobile information device 200 and to remotely operate the MFP 100 by using the mobile information device 200A. Therefore, there is a high possibility that the user A mainly uses the mobile information device 200A. In addition, the remote operation received from the mobile information device 200A that is a sub device is an operation by the user A who operates the mobile information device 200. Therefore, by transmitting data to the mobile information device 200 that is a master device, it is possible to improve user's convenience. For example, in a case where transmitting data to the mobile information device 200A, it is not necessary to transfer the data from the mobile information device 200A to the mobile information device 200A.

On the other hand, in step S47, it is determined whether or not the disconnection flag is set to "0". If the disconnection flag is set to "0", the process proceeds to step S48. If not, the process proceeds to step S51. In step S48, it is determined whether or not the mobile information device 200 that is a master device remotely operates any of the other MFPs 100A and 100B. The determination is performed by inquiring of any one of the mobile information device 200 and the MFPs 100A and 100B. If the mobile information device 200 remotely operates any one of the MFP 100A and the MFP 100B, the process returns to step S42. If the mobile information device 200 does not remotely operate any one of the MFP 100A and the MFP 100B, the process proceeds to step S49. In step S49, the disconnection flag is set to "1", and the process proceeds to step S50. In step S50, it is determined whether or not a predetermined time elapses after the mobile information device 200 does not remotely operate any one of the MFPs 100A and 100B. If a predetermined time elapses after the mobile information device 200 does not remotely operate, the process returns to the remote control process. If not, the process proceeds to step S51.

In step S51, it is determined whether or not the mobile information device 200 that is a master device remotely operates any one of the other MFPs 100A and 100B. If the mobile information device 200 remotely operates any one of the MFP 100A and the MFP 100B, the process proceeds to step S52. However, if the mobile information device 200 does not remotely operate any of the MFP 100A and the MFP 100B, the process returns to step S42. In step S52, the disconnection flag is set to "0", and the process returns to step S42.

Next, a concrete connection operation in the setting system 1 will be described. FIG. 9 is a first diagram illustrating an example of a user table. The user table illustrated in FIG. 9 is stored in the MFP 100. In MFP 100, the users A, B, and C are registered as users that are permitted to use the MFP 100. Herein, the user identification information of the user A, the user B, the user C, and the user D is referred to as "user A", "user B", "user C", and "user D", respectively. Referring to FIG. 9, the user table is configured to include a user record including an item of user identification information and an item of authentication information. With respect to the item of user identification information, the user identification information is set to the item. With respect to the item of authentication information, the password as authentication information is set to the item.

FIG. 10 is a second diagram illustrating an example of a user table. The user table illustrated in FIG. 10 is stored in the MFP 100A. Referring to FIG. 10, a user A, a user B, a user C, and a user D are registered in MFP 100A as users permitted to use the MFP 100A.

FIG. 11 is a first diagram illustrating an example of the device table. The device table illustrated in FIG. 11 is stored in the MFP 100. Referring to FIG. 11, the device table stored in MFP 100 includes a device record corresponding to mobile information device 200 and a device record corresponding to mobile information device 200B. Herein, the device identification information of the mobile information device 200 is referred to as a "terminal A", the device identification information of the mobile information device 200A is referred to as a "terminal B", and the device identification information of the mobile information device 200B is referred to as a "terminal C". The device record includes an item of terminal identification information, an item of registered user, an item of distance to the terminal, and an item of available mode. With respect to the item of terminal identification information, device identification information of a device registered as a device capable of remotely operating the MFP 100 is set to the item. With respect to the item of the registered user, in the case of restricting the user who can remotely operate the MFP 100 by using the device specified by the device identification information, the user identification information of the user is set to the item, and in the case of not restricting the user who can remotely operation the MFP, "arbitrary" is set to the item. With respect to the item of the network, a network condition for communicating with a device specified by the device identification information is set to the item. In the case of restricting the network condition, for example, network identification information for identifying a network where a plurality of devices are set as a group is set to the item of the network, and in the case of not restricting the network condition, "arbitrary" is set to the item. With respect to the item of the distance to the terminal, in the case of restricting the distance to the device specified by the device identification information, the distance to the device specified by the device identification information is set to the item, and in the case of not restricting the distance, "arbitrary" is set to the item. With respect to the item of available mode, the security level is set to the item.

The device record in which the device identification information "terminal A" set in the item of device identification information is set indicates that, in a case where the mobile information device 200 specified by the device identification information "terminal A" communicates through the network of the network identification information "AAA domain" regardless of the location thereof, namely, the distance from the MFP 100, the user A identified by the user identification information "user A" or the user B identified by the user identification information "user B" can be allowed to operate the mobile information device 200 within a range of authority given by the security level of "manager". In addition, the device record in which the device identification information "terminal C" set in the item of the device identification information is set indicates that, in a case where the mobile information device 200B specified by the device identification information "terminal C" is located within a distance of 10 m from the MFP 100, an arbitrary user can be allowed to operate the mobile information device 200B within a range of authority given by the security level of "general user".

FIG. 12 is a second diagram illustrating an example of the device table. The device table illustrated in FIG. 12 is stored in MFP 100A. Referring to FIG. 12, the device record in which the device identification information "terminal A" set in the item of device identification information is set indicates that, in a case where the mobile information device 200 specified by device identification information "terminal A" is located within a distance of 5 m from the MFP 100, the user A identified by the user identification information "user A" can be allowed to operate the mobile information device 200 within a range of authority given by the security level of "manager". In addition, the device record in which the device identification information "terminal B" set in the item of the device identification information is set indicates that, in a case where the mobile information device 200A specified by the device identification information "terminal B" is located within a distance of 10 m from the MFP 100, an arbitrary user can be allowed to operate the mobile information device 200A within a range of authority given by the security level of "general user".

Therefore, the user A can remotely operate the MFP 100 by using any one of the mobile information devices 200 and 200B and can remotely operate the MFP 100A by using any one of the mobile information devices 200 and 200A. In the MFP 100, the user A is not set so that the user can remotely operate the MFP 100 by using the mobile information device 200A.

In the setting system 1 according to the embodiment, in the case the user A remotely operates the MFP 100 and the MFP 100A by using the mobile information device 200, the remote operation of the MFP 100 can be enabled by using the mobile information device 200A. In addition, herein, the case where the MFP 100 can be allowed to be remotely operated by using the mobile information device 200A that is not registered in the MFP 100 is described as an example. But not limited to the mobile information device 200A registered in the MFP 100A, the remote operation of the MFP 100A may be enabled by using a device that is not registered in any one of the MFP 100, 100A, and 100B.

Figure 13:
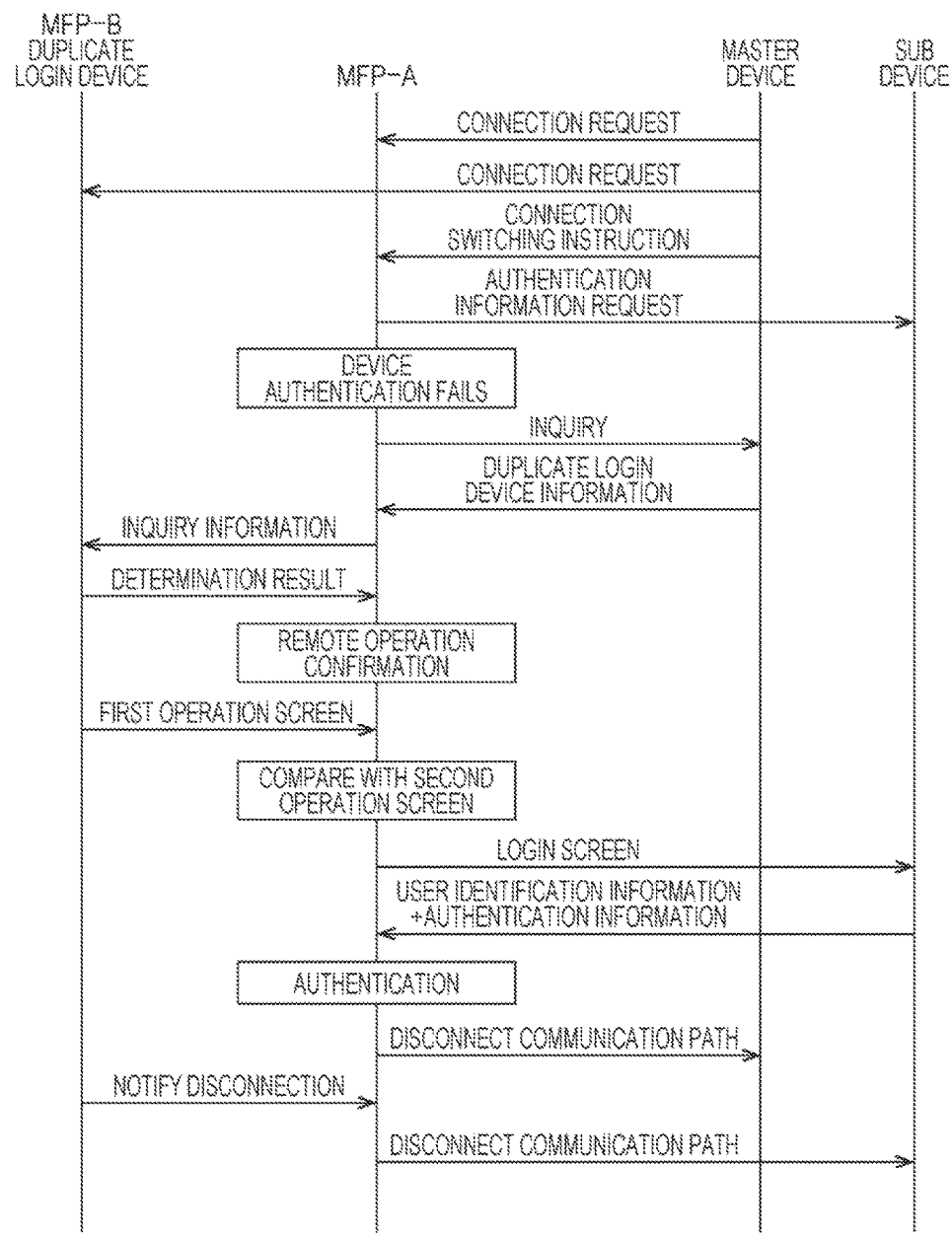
FIG. 13 is a diagram illustrating an example of a flow of information in a setting system.

FIG. 13 is a diagram illustrating an example of a flow of information in the setting system. In FIG. 13, the elapse of time is illustrated from the top to the bottom. In addition, herein, the mobile information device 200 registered in the MFP 100 is indicated as a "master device", and the mobile information device 200A not registered in the MFP 100 is illustrated as a "sub device". In addition, the MFP 100 is indicated by device identification information "MFP-A", and the MFP 100A is indicated by device identification information "MFP-B".

Referring to FIG. 13, if the user A operates the mobile information device 200 that is a master device and instructs to remotely operate the MFP 100, the mobile information device 200 transmits a connection request to the MFP 100. When the MFP 100 receives the connection request from the mobile information device 200, the MFP performs the device authentication of the mobile information device 200 by referring to the device table illustrated in FIG. 11 and performs the user authentication of the user A by referring to the user table illustrated in FIG. 9 to permit the user A to log in and to enable the remote operation.

Next, if the user A operates the mobile information device 200 that is a master device and instructs to remotely operate the MFP 100A, the mobile information device 200 transmits a connection request to the MFP 100A. When the MFP 100A receives the connection request from the mobile information device 200, the MFP performs the device authentication of the mobile information device by referring to the device table illustrated in FIG. 12 and performs the user authentication of the user A by referring to the user table illustrated in FIG. 11 to permit the user A to log in and to enable the remote operation. In this state, the user A can remotely operate the MFP 100 by using the mobile information device 200 and can remotely operate the MFP 100A by using the mobile information device 200.

Next, the user A operates the mobile information device 200 that is a master device to perform a remote operation of instructing the MFP 100 to switch to the mobile information device 200A that is a sub device. In this case, the mobile information device 200 transmits a remote operation indicating a connection switching instruction to the MFP 100. Herein, the connection switching instruction that is a remote operation transmitted by the mobile information device 200 includes the device identification information of the mobile information device 200A that is a sub device. The MFP 100 which receives the remote operation indicating the connection switching instruction requests the authentication information from the mobile information device 200A that is a sub device. The mobile information device 200A returns the authentication information, but since the mobile information device 200A is not registered in the MFP 100A, the authentication of the mobile information device 200A fails in the MFP 100A. In this case, the MFP 100 inquires the duplicate login device of the mobile information device 200 that is a master device that has transmitted the remote operation indicating the connection switching instruction. The mobile information device 200 which receives the inquiry from the MFP 100 returns the duplicate login device information including the device identification information of the MFP 100A that is a duplicate login device that is remotely operated separately from the MFP 100.

The MFP 100 that receives the duplicate login device information specifies the MFP 100A as a duplicate login device and transmits inquiry information to the MFP 100A. The inquiry information includes device identification information of the master device and is information for inquiring whether or not it is remotely operated by the master device.

When receiving the inquiry information, the MFP 100A determines whether or not the mobile information device 200 specified by the device identification information included in the inquiry information is remotely operated and returns a determination result. Since the MFP 100A is remotely operated by the mobile information device 200, the MFP returns the determination result indicating that the MFP 100A is remotely operated. The MFP 100 confirms that the MFP 100A is remotely operated by the mobile information device 200 on the basis of the determination result received from the MFP 100A.

In the case of confirming that the MFP 100A is remotely operated by the mobile information device 200, the MFP 100 acquires, from the MFP 100A, the screen identification information of the first operation screen that is a remote operation screen that the MFP 100A transmits to the mobile information device 200. When receiving the screen identification information of the first operation screen, the MFP 100 compares the first operation screen with the second operation screen that is a remote operation screen that the MFP 100 transmits to the mobile information device 200. The MFP 100 transmits a login screen to the mobile information device 200A that is a sub device on the condition that the first operation screen and the second operation screen are screens having a predetermined relationship. The predetermined relationship is a relationship that the first operation screen and the second operation screen belong to the same category, a relationship that the first operation screen and the second operation screen are displayed in the same mode, or a relationship that the first operation screen and the second operation screen are the same screen. In many cases where the mobile information device 200 displays a screen in a predetermined relationship with the MFP 100 and the MFP 100A, the same category, the same mode, or the same set value may be set to the MFP 100 and the MFP 100A. For this reason, only in a case where there is a high probability that the MFP 100 and the MFP 100A are similarly set, the connection can be switched from the master device to the sub device.

The mobile information device 200A that is a sub device that receives the login screen displays the login screen and receives and returns the authentication information input by the user A. If the user who operates the mobile information device 200A inputs the user identification information and the password to the mobile information device 200A in accordance with the login screen, the mobile information device 200A transmits the user identification information and the password to the MFP 100. The MFP 100 performs authentication by referring to the user table illustrated in FIG. 9. Herein, since the user A who operates the mobile information device 200 performs a remote operation of instructing switching to the mobile information device 200A that is a sub device, there is a high probability that the user who operates the mobile information device 200A is the user A. In a case where the user authentication of the user A succeeds, the MFP 100 permits the user A who operates the mobile information device 200A that is a sub device to log in and, after that, handles the remote operation received from the mobile information device 200 as an operation by the user A. In addition, on the condition that the user who operates the mobile information device 200 that is a master device and the user who operates the mobile information device 200A are the same, the MFP may permit the user A who operates the mobile information device 200A that is a sub device to log in.

In a case where MFP 100 permits the user A who operates the mobile information device 200A that is a sub device to log in, the MFP ends the remote operation by the mobile information device 200 that is a master device and disconnects the communication path established with respect to the mobile information device 200.

In addition, in a case where the MFP 100 receives a disconnection notification indicating that the remote operation by the mobile information device 200 has been ended from the MFP 100A that is a duplicate login device while the MFP is remotely operated by the user A who operates the mobile information device 200B, the MFP 100 ends the remote operation by the user A who operates the mobile information device 200A and disconnects the communication path established with respect to the mobile information device 200A. Therefore, the remote operation of the MFP 100A by the mobile information device 200A that is a sub device can be end in interlock with the end of the remote operation of the MFP 100 by the mobile information device 200 that is a master device. In addition, the MFP 100 may be notified that the remote operation of the MFP 100A has ended from the mobile information device 200.

Modified Example 1

Figure 14:
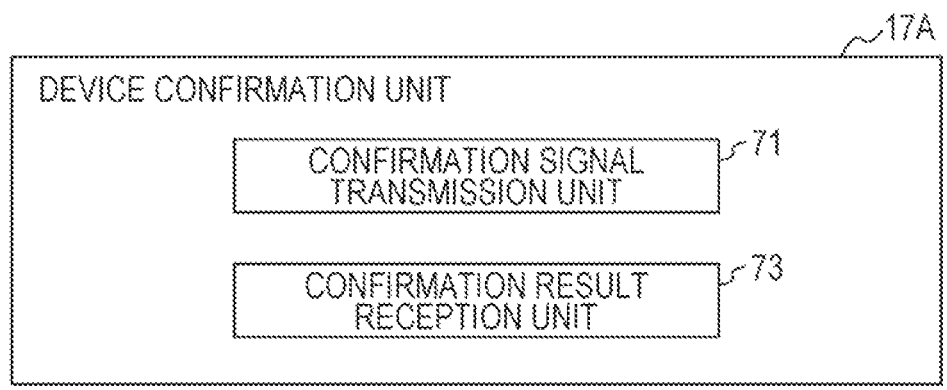
FIG. 14 is a diagram illustrating an example of functions of a device confirmation unit in Modified Example 1.

Modified Example 1 is a modification of the method in which the MFP 100 confirms the duplicate login device. FIG. 14 is a diagram illustrating an example of functions of the device confirmation unit according to Modified Example 1. Referring to FIG. 14, a device confirmation unit 17A according to Modified Example 1 is configured to include a confirmation signal transmission unit 71 and a confirmation result reception unit 73. The confirmation signal transmission unit 71 controls the communication I/F unit 112 to communicate with a master device and transmit a confirmation signal. When receiving the confirmation signal, if there is a device other than the MFP 100 that remotely operates, the master device requests the device to reply to the MFP 100. The request includes the device identification information of the MFP 100 that has transmitted the confirmation signal.

When receiving the request from the master device, the duplicate login device controls the communication I/F unit 112 to transmit a confirmation result indicating that the MFP 100 specified by the device identification information included in the request is remotely operated by the master device.

The confirmation result reception unit 73 controls the communication I/F unit 112 to determine that the duplicate login device is remotely operated by the master device in response to reception of the confirmation result from the duplicate login device. In a case where the confirmation result reception unit 73 does not receive the confirmation result from any one of the MFPs 100A and 100B before a predetermined time elapses after the confirmation signal transmission unit 71 transmits the confirmation signal, the confirmation result reception unit 73 determines that the master device does not remotely operate the duplicate login device.

Modified Example 2

In the setting system 1 according to the embodiment described above, each of the MFPs 100, 100A, and 100B is configured to execute the device authentication and the user authentication. In Modified Example 2, each of the MFPs 100, 100A, and 100B is configured to execute the device authentication so that the user authentication is not executed. For example, the modified example can be applied to the case where the MFPs 100, 100A, and 100B are installed in an environment where entrance is restricted to an area such as a company building which is closed from the outside. In this case, since a user who operates the MFP 100, 100A, and 100B is restricted to the user who is permitted to enter, in some cases, it is not necessary to authenticate the user who operates the MFPs 100, 100A, and 100B.

Figure 15:
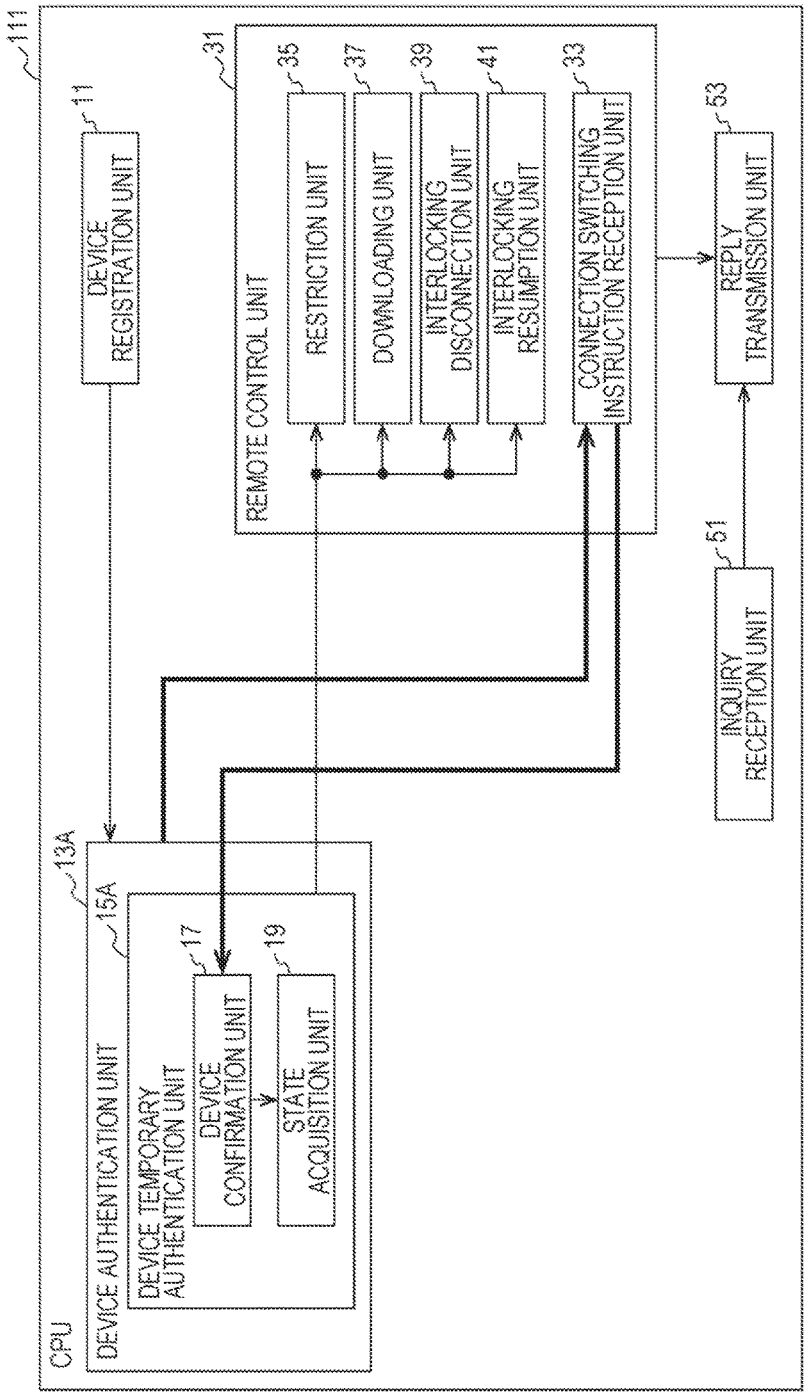
FIG. 15 is a diagram illustrating an example of an overview of functions of a CPU of an MFP according to Modified Example 2.

FIG. 15 is a diagram illustrating an example of an overview of the functions of the CPU of the MFP in Modified Example 2. Referring to FIG. 15, the functions are different from the functions illustrated in FIG. 4 in terms that the user registration unit 21 and the user authentication unit 23 are deleted and the device authentication unit 13 is replaced with a device authentication unit 13A. The other functions are basically the same as the functions illustrated in FIG. 4. Hereinafter, different points will mainly be described.

In a case where the device connected to the MFP 100 is authenticated, as indicated by thick arrows in FIG. 15, the device authentication unit 13A outputs the device identification information of the authenticated device to the remote control unit 31. In addition, in a case where a registered device is registered in another device different from the MFP 100, for example, in a server, the device authentication unit 13A requests the server to perform device authentication and acquires the authentication result from the server. In a case where the device identification information is input from the device authentication unit 13A, the remote control unit 31 executes a process according to the remote operation that the communication I/F unit 112 receives from the device specified by the device identification information. In other words, in a case where the communication I/F unit 112 is connected to a device registered in advance in the MFP 100, the remote control unit 31 executes a process according to the remote operation received from the device. After the device identification information is input from the device authentication unit 13A, in a case where a remote operation indicating that the remote operation is to be ended is received or in a case where the communication I/F unit 112 cannot communicate with the device specified by the device identification information, the remote control unit 31 ends the remote operation.

In a case where it is determined by the device confirmation unit 17 that the duplicate login device is remotely operated by the master device, if it is determined that the first operation screen specified by the screen identification information acquired by the state acquisition unit 19 and the second operation screen transmitted by the remote control unit 31 for the master device are in a predetermined relationship, the device temporary authentication unit 15A included in the device authentication unit 13A can enable the authentication of the sub device. In a case where the communication I/F unit 112 receives a connection request for remote control from the sub device while the authentication of the sub device can be enabled, the device temporary authentication unit 15A authenticates the sub device, and as indicated by thin arrows in FIG. 15, the device temporary authentication unit outputs the device identification information of the sub device to the remote control unit 31.

Figure 16:
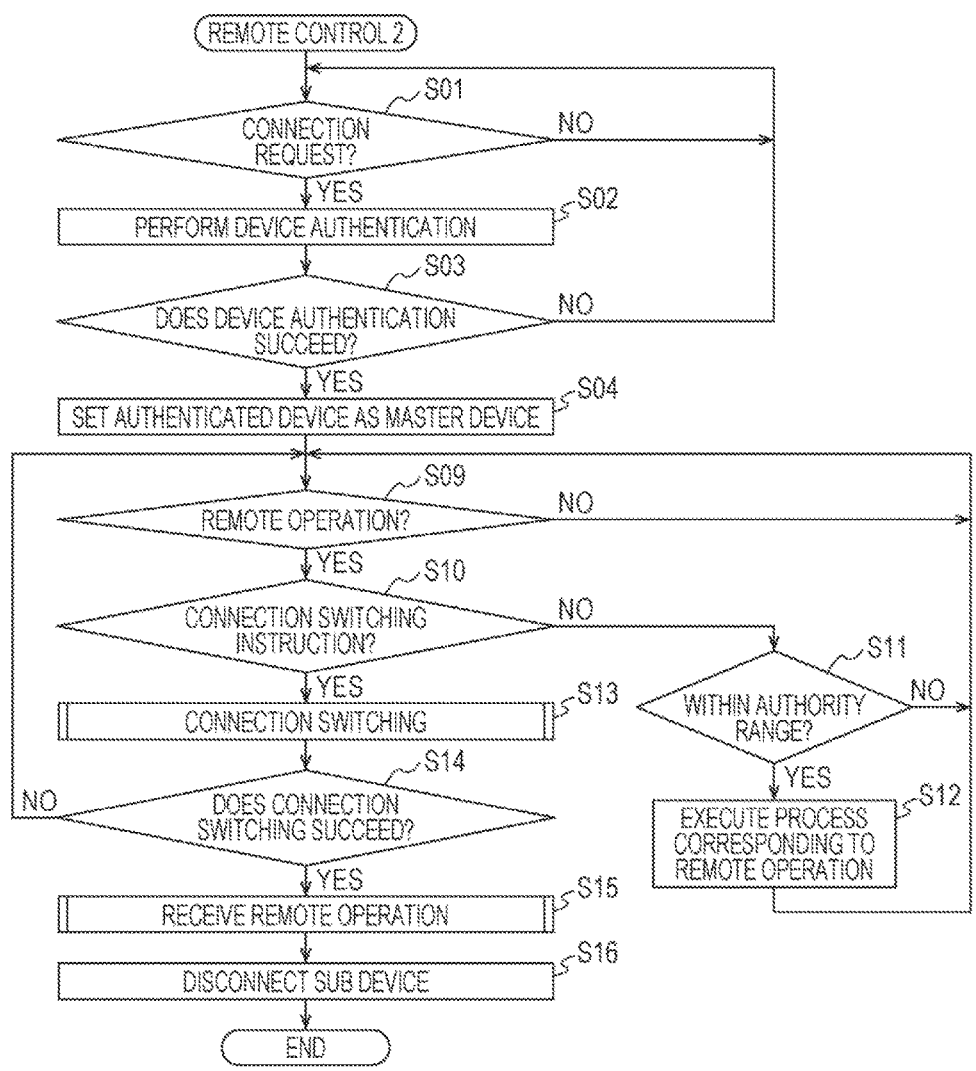
FIG. 16 is a flowchart illustrating an example of a flow of a remote control process according to Modified Example 2.

FIG. 16 is a flowchart illustrating an example of the flow of remote control process in Modified Example 2. Referring to FIG. 16, the remote control process is different from the remote control process illustrated in FIG. 6 in terms that steps S05 to S08 are deleted. Since the other processes are the same as the processes illustrated in FIG. 6, and thus, the description thereof will not be repeated herein.

Figure 17:
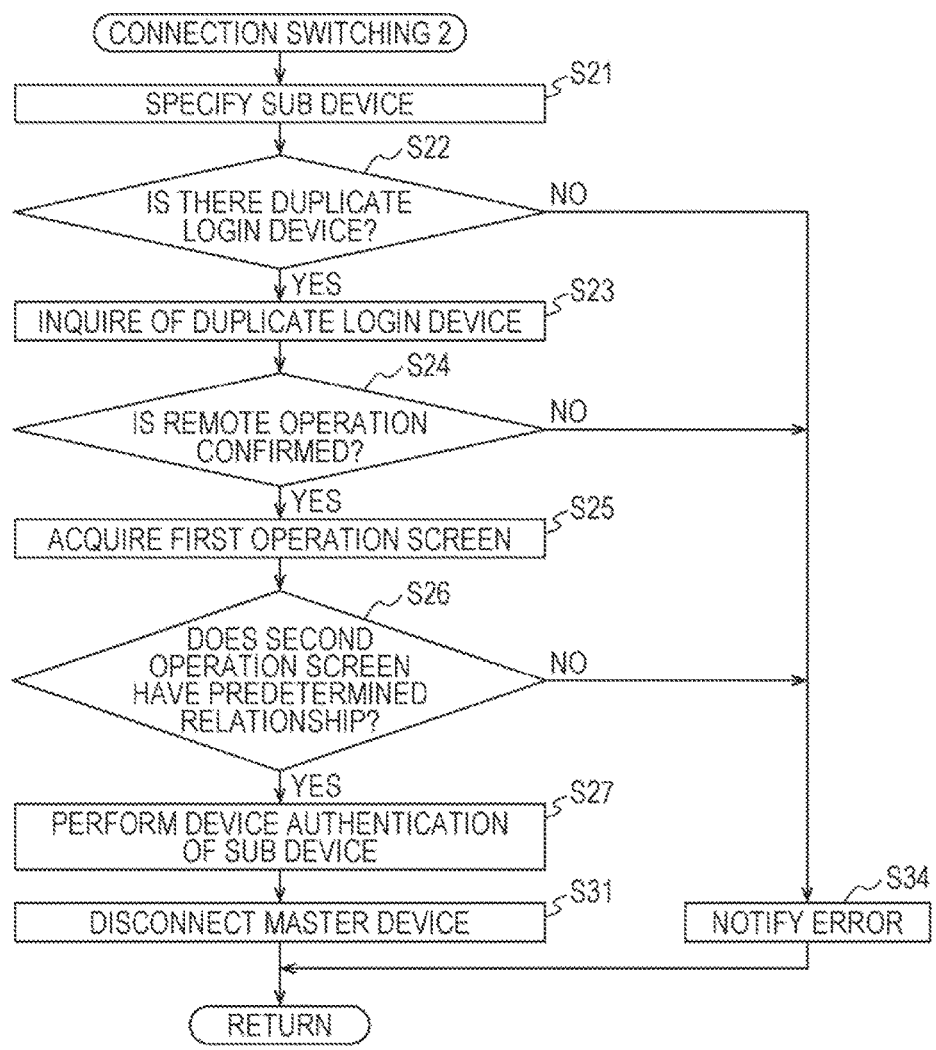
FIG. 17 is a flowchart illustrating an example of a flow of a connection switching process according to Modified Example 2.

FIG. 17 is a flowchart illustrating an example of the flow of the connection switching process in Modified Example 2. Referring to FIG. 17, the connection switching process is different from the connection switching process illustrated in FIG. 7 in terms that steps S28 to S30, S32, and S33 are deleted. The other processes are the same as the processes illustrated in FIG. 7, and thus, the description thereof will not be repeated herein.

Figure 18:
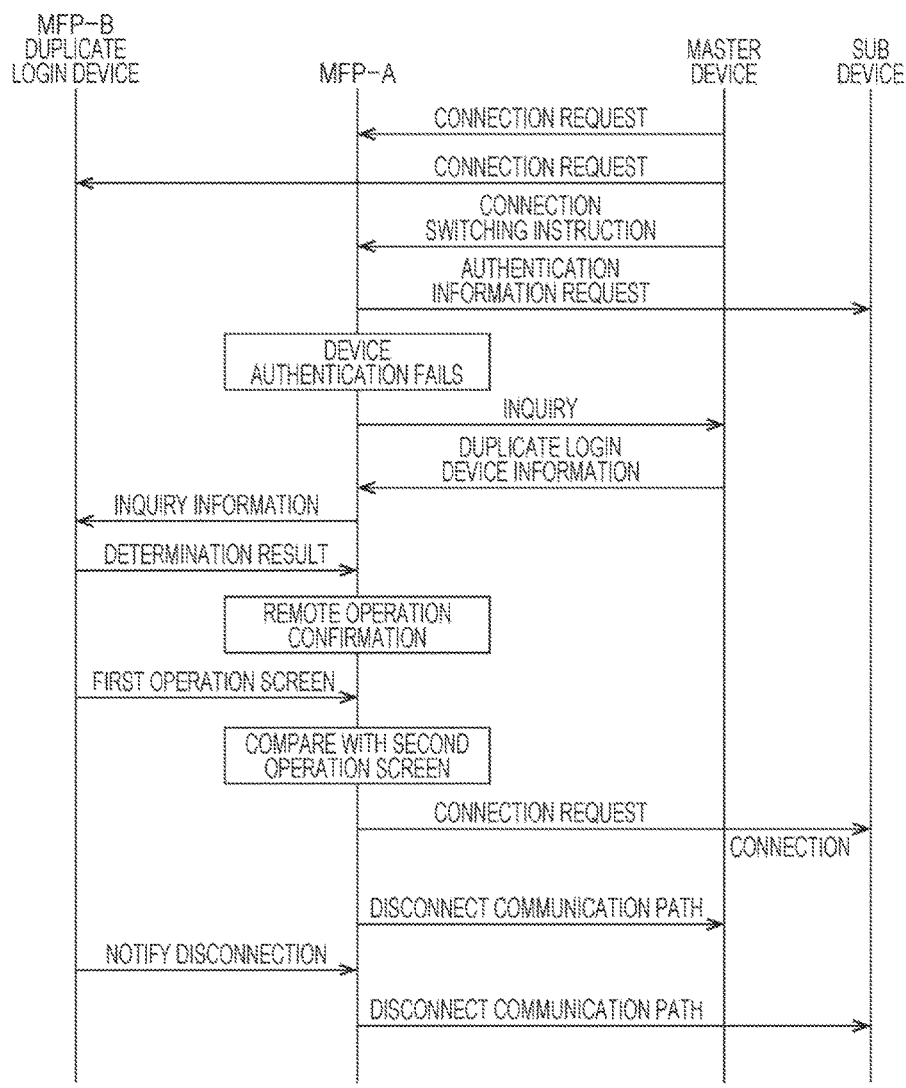
FIG. 18 is a diagram illustrating an example of a flow of information in a setting system according to Modified Example 2.

FIG. 18 is a diagram illustrating an example of a flow of information in the setting system according to Modified Example 2. In FIG. 18, the elapse of time is illustrated from the top to the bottom. In addition, herein, the mobile information device 200 registered in the MFP 100A is illustrated as a "master device", and the mobile information device 200A not registered in the MFP 100A is illustrated as a "sub device". In addition, the MFP 100 is indicated by device identification information "MFP-A", and the MFP 100A is indicated by device identification information "MFP-B".

Referring to FIG. 18, if user A operates mobile information device 200 that is a master device and instructs to remotely operate the MFP 100, the mobile information device 200 transmits a connection request to MFP 100. When the MFP 100 receives the connection request from mobile information device 200, the mobile information device 200 is authenticated by referring to the device table illustrated in FIG. 11, and the remote operation received from mobile information device 200 can be enabled.

Next, if the user A operates the mobile information device 200 that is a master device and instructs to remotely operate the MFP 100A, the mobile information device 200 transmits a connection request to the MFP 100A. When the MFP 100A receives the connection request from the mobile information device 200, the mobile information device 200 is authenticated by referring to the device table illustrated in FIG. 12, and after that, the remote control received from the mobile information device 200 can be enabled.

Next, the user A operates the mobile information device 200 that is a master device and performs a remote operation of instructing the MFP 100 to switch to the mobile information device 200A that is a sub device. In this case, the mobile information device 200 transmits a remote operation indicating a connection switching instruction to the MFP 100. Herein, the connection switching instruction that is a remote operation transmitted by the mobile information device 200 includes the device identification information of the mobile information device 200A that is a sub device. The MFP 100 which receives the remote operation indicating the connection switching instruction requests authentication information from the mobile information device 200A that is a sub device. The mobile information device 200A returns the authentication information, but since the mobile information device 200A is not registered in the MFP 100, the authentication of the mobile information device 200A fails in the MFP 100. In this case, the MFP 100 inquires the duplicate login device of the mobile information device 200 that is a master device that has transmitted the remote operation indicating the connection switching instruction. The mobile information device 200 which receives the inquiry from the MFP 100 returns the duplicate login device information including the device identification information of the MFP 100A that is a duplicate login device that is remotely operated separately from the MFP 100.

The MFP 100 that receives the duplicate login device information specifies the MFP 100A as a duplicate login device and transmits inquiry information to the MFP 100A. The inquiry information includes device identification information of the master device and is information for inquiring whether or not it is remotely operated by the master device.

When receiving the inquiry information, the MFP 100A determines whether or not the mobile information device 200 specified by the device identification information included in the inquiry information is remotely operated and returns the determination result. Since the MFP 100A is remotely operated by the mobile information device 200, the MFP returns the determination result indicating that the MFP 100A is remotely operated. The MFP 100 confirms that the MFP 100A is remotely operated by the mobile information device 200 on the basis of the determination result received from the MFP 100A.

In the case of confirming that the MFP 100A is remotely operated by the mobile information device 200, the MFP 100 acquires, from the MFP 100A, the screen identification information of the first operation screen that is a remote operation screen that the MFP 100A transmits to the mobile information device 200. When receiving the screen identification information of the first operation screen, the MFP 100 compares the first operation screen with the second operation screen that is a remote operation screen that the MFP 100 transmits to the mobile information device 200. The MFP 100 transmits a connection request to the mobile information device 200A that is a sub device on the condition that the first operation screen and the second operation screen are screens having a predetermined relationship.

The mobile information device 200A that is a sub device that receives the connection request establishes a communication path to the MFP 100 and, after that, executes a process according to the remote operation received from the mobile information device 200.

In a case where the MFP 100 permits remote operation by the mobile information device 200A that is a sub device, the MFP ends the remote operation by the mobile information device 200 that is a master device. More specifically, the MFP disconnects the communication path established with respect to the mobile information device 200.

In addition, in a case where the MFP 100 receives a disconnection notification indicating that the remote operation by the mobile information device 200 has been ended from the MFP 100A that is a duplicate login device while the MFP is remotely operated by the user A who operates the mobile information device 200B, the remote operation by the mobile information device 200A is ended. Therefore, the remote operation of the MFP 100A by the mobile information device 200A that is a sub device can be end in interlock with the end of the remote operation of the MFP 100 by the mobile information device 200 that is a master device. In addition, the MFP 100 may be notified that the remote operation of the MFP 100A has ended from the mobile information device 200.

As described above, in the setting system according to the embodiment, in a case where a remote operation of instructing connection with the mobile information device 200A not registered is received from the mobile information device 200 registered by the device registration unit 11, the MFP 100 authenticates the mobile information device 200A is authenticated and executes a process according to the remote operation received from the mobile information device 200A on the condition that it is confirmed by the MFP 100A that is a duplicate login device that the mobile information device 200 remotely operates that the remote operation is performed by the mobile information device 200. Therefore, the remote control by the mobile information device 200 that is not registered by the device registration unit 11 can be enabled. Since each of the MFP 100 and the MFP 100A needs to authenticate the mobile information device 200, it is possible to prevent the device from spoofing. Therefore, while the remote operation by an unauthorized device is excluded, the remote control by an unregistered device can be enabled.

In addition, the MFP 100 authenticates the mobile information device 200 and executes a process according to the remote operation received from the mobile information device 200 on the condition that the user who operates the mobile information device 200 is authenticated, and in a case where a remote operation of instructing connection with the mobile information device 200A is received from the mobile information device 200, the MFP 100A authenticates the mobile information device 200A on the condition that it is confirmed that the MFP 100A is remotely operated by the mobile information device 200. The MFP 100A authenticates the mobile information device 200 and executes a process according to the remote operation received from the mobile information device 200 on the condition that the user who operates the mobile information device 200 is authenticated. Therefore, since the user who operates the mobile information device 200 needs to be authenticated by the MFP 100 and the MFP 100A, it is possible to prevent a user who operates the mobile information device 200 from spoofing. Therefore, while an operation by an unauthorized user is excluded, the remote control by an unregistered device can be enabled.

In addition, the MFP 100 authenticates the user who operates the mobile information device 200A on the condition that the user who operates the mobile information device 200 and the user who operates the mobile information device 200A are the same. Therefore, it is possible to restrict the user who can perform the remote control by the mobile information device 200A which is not registered to the users registered in at least two of the MFPs 100, 100A, and 100B.

In addition, preferably, the device temporary authentication unit acquires the device identification information for identifying the duplicate login device from the master device and, by inquiring of the duplicate login device by using the acquired device identification information, the device temporary authentication unit confirms that the duplicate login device is remotely operated by the master device.

In the case or the like where the users who manage the MFPs 100, 100A, and 100B are the same, a predetermined trust relationship is established among the MFPs 100, 100A, and 100B. Since the MFP 100 confirms that the MFP 100A is remotely operated by the mobile information device 200, the operation of the master device by an unauthorized user can be excluded.

In addition, since the MFP 100 authenticates the mobile information device 200A on the condition that the first operation screen displayed by the mobile information device 200 remotely operating the MFP 100A and the second operation screen displayed by the mobile information device 200 remotely operating the MFP 100 are in a predetermined relationship, it is possible to restrict the remote operation using the mobile information device 200A.

In addition, since the processes which can be executed by the MFP 100 remotely operated by the mobile information device 200A are restricted to one or more processes defined for the security level assigned to the user who operates the mobile information device 200, it is possible to restrict the remote operation using the mobile information device 200A.

In addition, in a case where the process specified by the remote operation received from the mobile information device 200A that is a sub device is a process of downloading data, the MFP 100 transmits the data to the mobile information device 200 is a master device without transmitting data to the mobile information device 200A. Therefore, for example, since it is not necessary to perform an operation of allowing the mobile information device 200A that is a sub device to transmit data to the mobile information device 200, it is possible to simplify the operation.

In addition, since the MFP 100 disconnects communication with the mobile information device 200A in response to end of the remote operation of the MFP 100A that is a duplicate login device by the mobile information device 200, it is possible to omit an operation of ending the remote operation of the mobile information device 200A.

In addition, a predetermined time elapses without the mobile information device 200 remotely operating any of the MFPs 100A and 100B, since the MFP 100 disconnects communication with the mobile information device 200A, during the remote operation of the MFPs 100A and 100B by the mobile information device 200, the remote operation by the mobile information device 200A can be enabled.

In addition, since the MFP 100 disconnects communication with the mobile information device 200 in response to start of the remote control by the mobile information device 200 that is a sub device corresponding to the mobile information device 200 that is a master device, it possible to simplify an operation of disconnecting the communication with the master device. In addition, since the remote operation by the mobile information device 200 is restarted in response to end of the remote operation by the mobile information device 200, the remote operation by any one of the master device and the sub device can be enabled.

In addition, in the above-described embodiment, the setting system 1 has been described, but it goes without saying that the invention can be grasped by a remote control method for allowing the MFP 100 to perform the remote control processes illustrated in FIGS. 6 to 8 or FIGS. 16 and 17, and a remote control program for allowing the CPU 111 controlling the MFP 100 to execute the remote control method.

APPENDIX (1) The image processing device of Item. 2, further including:

a device registration unit that registers one or more mobile information devices among a plurality of mobile information devices; and a device authentication unit that authenticates a device that has transmitted a connection request among the plurality of mobile information devices on the condition that the device is registered as a registered device by the device registration unit, wherein the remote control unit executes a process according to the received remote operation on the condition that the master device is authenticated by the device authentication unit, and even if the sub device is not registered as a registered device by the device registration unit, on the condition that it is confirmed by the confirmation unit that the duplicate login device is remotely operated by the master device, a process according to the remote operation received from the sub device is executed.

(2) The image processing device of (1), further including:

a user registration unit that registers one or more users as registered users; and a user authentication unit that authenticates a user who operates the master device authenticated by the device authentication unit on the condition that the user is registered as a registered user by the user registration unit, wherein the user authentication unit authenticates the user who operates the sub device authenticated by the device temporary authentication unit on the condition that the user is registered as a registered user by the user registration unit, and the remote control unit executes the process according to the remote operation received from the master device on the condition that the user who operates the master device is authenticated by the user authentication unit, and the remote control unit executes the process according to the remote operation received from the sub device on the condition that the user who operates the sub device is authenticated by the user authentication unit.

(3) The image processing device of Item. 7, wherein the predetermined relationship is a relationship that the first operation screen and the second operation screen belong to the same category.

(4) The image processing device of Item. 7, wherein the predetermined relationship is a relationship that the first operation screen and the second operation screen belong to the same mode.

(5) The image processing device of Item. 7, wherein the predetermined relationship is a relationship that the first operation screen and the second operation screen are the same.

Although the present invention has been described and illustrated in detail, it is clearly understood that the same is by way of illustrated and example only and is not to be taken by way of limitation, the scope of the present invention being interpreted by terms of the appended claims. The scope of the present invention is intended to include equivalents to the claims and all modifications within the scope.

What is claimed is:

1. An image processing device comprising:
a hardware processor configured to:
execute a process according to a received remote operation in response to reception of the remote operation from a master device registered in advance among a plurality of mobile information devices;
confirm to a duplicate login device other than an own device among the plurality of image processing devices that the duplicate login device is remotely operated by the master device in a case where a remote operation of instructing connection with a sub device different from the master device is received from the master device; and
execute a process according to a remote operation received from the sub device in a case where it is confirmed by the hardware processor that the duplicate login device is remotely operated by the master device.

2. The image processing device according to claim 1, wherein the hardware processor executes the process according to the remote operation received from the master device on the condition that a user who operates the master device is registered in advance and executes the process according to the remote operation received from the sub device on the condition that a user who operates the sub device is registered in advance.

3. The image processing device according to claim 2, wherein the hardware processor executes the process according to the remote operation received from the sub device on the condition that the user who operates the sub device is the same as the user who operates the master device.

4. The image processing device according to claim 1, wherein the hardware processor acquires device identification information for identifying the duplicate login device from the master device and confirms that the duplicate login device is remotely operated by the master device by inquiring of the duplicate login device by using the acquired device identification information.

5. The image processing device according to claim 1,
wherein, in response to reception of a confirmation signal, the master device transmits a notification request command including device identification information of a device that has transmitted the confirmation signal to the duplicate login device,
in response to reception of the notification request command from the master device, the duplicate login device notifies a device specified by the device identification information included in the notification request command that the duplicate login device is remotely operated by the master device, and
after transmitting the confirmation signal to the master device, the hardware processor receives a notification from the duplicate login device that the duplicate login device is remotely operated by the master device, so that it is confirmed that the duplicate login device is remotely operated by the master device.

6. The image processing device according to claim 1, wherein the hardware processor acquires screen identification information for identifying a first operation screen that the duplicate login device is remotely operated by the master device to select, and the hardware processor executes the process according to the remote operation received from the sub device on the condition that a second operation screen that the hardware processor is remotely operated by the master device to select has a predetermined relationship with the first operation screen.

7. The image processing device according to claim 1, wherein the hardware processor restricts executable processes according to the remote operation received from the sub device.

8. The image processing device according to claim 7, wherein one or more executable processes corresponding to a plurality of security levels are defined, and the restriction is restriction to one or more processes defined with respect to the security levels assigned to the user who operates the sub device.

9. The image processing device according to claim 1, wherein, in a case where the process specified by the remote operation received from the sub device is a process of downloading data, the hardware processor transmits data to the master device without transmitting data to the sub device.

10. The image processing device according to claim 1, wherein the hardware processor disconnects communication with the sub device in response to end of the remote operation of the duplicate login device by the master device.

11. The image processing device according to claim 1, wherein, while the master device remotely operates any one of the plurality of image processing devices, the hardware processor executes the process according to the remote operation received from the sub device, and if a predetermined time elapses without the master device remotely operating any one of the image processing devices, the hardware processor disconnects communication with the sub device.

12. The image processing device according to claim 1, wherein, in response to start of the remote operation by the sub device, the hardware processor disconnects communication with the master device, and the hardware processor restarts the remote operation by the master device in response to end of the remote operation by the sub device.

13. A setting system comprising:
    a plurality of the image processing devices according to claim 1; and
    a plurality of mobile information devices for remotely operating the plurality of image processing devices.

14. A remote control method causing an image processing device to perform:
    executing a process according to a received remote operation in response to reception of the remote operation from a master device registered in advance among a plurality of mobile information devices; and
    confirming to a duplicate login device other than an own device among a plurality of the image processing devices that the duplicate login device is remotely operated by the master device in a case where a remote operation of instructing connection with a sub device different from the master device is received from the master device,
    wherein the executing of the process according to the received remote operation from the master device includes executing a process according to a remote operation received from the sub device in a case where it is confirmed in the confirming that the duplicate login device is remotely operated by the master device.

15. A non-transitory recording medium storing a computer readable remote control program causing a computer controlling an image processing device to execute the remote control method according to claim 14.

16. The non-transitory recording medium storing a computer readable remote control program according to claim 15, wherein, in the executing of the process according to the received remote operation from the master device, the process according to the remote operation received from the master device is executed on the condition that a user who operates the master device is registered in advance and the process according to the remote operation received from the sub device is executed on the condition that a user who operates the sub device is registered in advance.

17. The non-transitory recording medium storing a computer readable remote control program according to claim 16, wherein, in the executing of the process according to the received remote operation from the master device, on the condition that the user who operates the sub device is the same as the user who operates the master device, the process according to the remote operation received from the sub device is executed.

18. The non-transitory recording medium storing a computer readable remote control program according to claim 15, wherein, in the executing of the process according to the received remote operation from the master device, device identification information for identifying the duplicate login device from the master device is acquired, and it is confirmed that duplicate login device is remotely operated by the master device by inquiring of the duplicate login device by using the acquired device identification information.

19. The non-transitory recording medium storing a computer readable remote control program according to claim 15,
    wherein, in response to reception of a confirmation signal, the master device transmits a notification request command including device identification information of a device that has transmitted the confirmation signal to the duplicate login device,
    in response to reception of the notification request command from the master device, the duplicate login device notifies a device specified by the device identification information included in the notification request command that the duplicate login device is remotely operated by the master device, and
    after transmitting the confirmation signal to the master device, in the executing of the process according to the received remote operation from the master device, a notification that the duplicate login device is remotely operated by the master device is received from the duplicate login device, so that it is confirmed that the duplicate login device is remotely operated by the master device.

20. The non-transitory recording medium storing a computer readable remote control program according to claim 15, wherein, in the executing of the process according to the received remote operation from the master device, screen identification information for identifying a first operation screen that the duplicate login device is remotely operated by the master device to select is acquired, in the executing of the process according to the received remote operation from the master device, the process according to the remote operation received from the sub device is executed on the condition that a second operation screen which is remotely operated by the master device to select has a predetermined relationship with the first operation screen.

21. The non-transitory recording medium storing a computer readable remote control program according to claim 15, wherein, in the executing of the process according to the received remote operation from the master device, executable processes according to the remote operation received from the sub device are restricted.

22. The non-transitory recording medium storing a computer readable remote control program according to claim 21, wherein one or more executable processes corresponding to a plurality of security levels are defined, and the restriction is restriction to one or more processes defined with respect to the security levels assigned to the user who operates the sub device.

23. The non-transitory recording medium storing a computer readable remote control program according to claim 15, wherein, in the executing of the process according to the received remote operation from the master device, in a case where the process specified by the remote operation received from the sub device is a process of downloading data, data is transmitted to the master device without transmitting data to the sub device.

24. The non-transitory recording medium storing a computer readable remote control program according to claim 15, wherein, in the executing of the process according to the received remote operation from the master device, communication with the sub device is disconnected in response to end of remote operation of the duplicate login device by the master device.

25. The non-transitory recording medium storing a computer readable remote control program according to claim 15, wherein, in the executing of the process according to the received remote operation from the master device, while the master device remotely operates any one of the plurality of image processing devices, the process according to the remote operation received from the sub device is executed, and if a predetermined time elapses without the master device remotely operating any one of the image processing devices, communication with the sub device is disconnected.

26. The non-transitory recording medium storing a computer readable remote control program according to claim 15, wherein, in the executing of the process according to the received remote operation from the master device, communication with the master device is disconnected in response to start of the remote operation by the sub device, and the remote operation by the master device is restarted in response to end of the remote operation by the sub device.

* * * * *